United States Patent
Bathwal et al.

(10) Patent No.: US 11,387,945 B1
(45) Date of Patent: Jul. 12, 2022

(54) MULTIPLE TIMERS FOR EFFECTIVE REORDERING

(71) Applicant: QUALCOMM Incorporated, San Diego, CA (US)

(72) Inventors: Saket Bathwal, Hyderabad (IN); Gang Andy Xiao, San Diego, CA (US); Xiaojian Long, San Diego, CA (US); Rudhir Varna Upretee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/216,911

(22) Filed: Mar. 30, 2021

(51) Int. Cl.
  *H04W 80/08* (2009.01)
  *H04L 1/16* (2006.01)
  *H04L 1/18* (2006.01)

(52) U.S. Cl.
  CPC .......... *H04L 1/1678* (2013.01); *H04L 1/1642* (2013.01); *H04L 1/1835* (2013.01); *H04L 1/1848* (2013.01)

(58) Field of Classification Search
  CPC ....... H04W 80/02; H04W 28/06; H04W 4/40; H04W 76/14; H04W 76/15; H04L 47/34
  See application file for complete search history.

(56) References Cited

U.S. PATENT DOCUMENTS

| | | | |
|---|---|---|---|
| 2013/0286860 A1* | 10/2013 | Dorenbosch | H04W 24/06 370/252 |
| 2017/0118133 A1* | 4/2017 | Meylan | H04W 88/06 |
| 2020/0068652 A1* | 2/2020 | Xu | H04L 1/1642 |

* cited by examiner

*Primary Examiner* — Jamal Javaid
(74) *Attorney, Agent, or Firm* — Holland & Hart LLP

(57) ABSTRACT

Methods, systems, and devices for wireless communications are described. In a wireless communications system, a user equipment (UE) may receive a set of packets having a sequential order. The UE may initiate a first packet data convergence protocol (PDCP) reordering timer based on a first time stamp corresponding to unsuccessful decoding of a first packet in the sequential order. The UE may then initiate, prior to the expiration of the first PDCP reordering timer, a second PDCP reordering timer. The second PDCP reordering timer may be based on a second time stamp corresponding to unsuccessful decoding of a second packet in the sequential order. In some cases, the UE may initiate the second PDCP reordering timer after expiration of the first PDCP reordering timer, but may decrease the duration of the second PDCP reordering timer.

29 Claims, 19 Drawing Sheets

MULTIPLE TIMERS FOR EFFECTIVE REORDERING

FIELD OF TECHNOLOGY

The following relates to wireless communications, including multiple timers for effective reordering.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multiple timers for effective reordering. Generally, the described techniques provide for a wireless communication device to support the use of multiple reordering timers (e.g., packet data convergence protocol (PDCP) reordering timers) to more efficiently perform reordering operations and reduce memory footprint for wireless communications. For example, a wireless device (e.g., a user equipment (UE)) may support multiple reordering timers simultaneously, or may support the sequential use of reordering timers with progressively shorter timer durations for reordering.

In some examples, a UE may establish two or more wireless communication links and may respectively communicate a sequence of packets over the two links. In some cases, one of the links may experience noisier conditions as compared to the other link, resulting in several packets in the sequence being lost during transport via the noisy link and increased storage buffer utilization while attempting to recover the missing packets in the sequence. In some examples, a UE may initiate a first reordering timer keyed to a sequence number of a first missed packet in the sequence, and may initiate a second reordering timer keyed to a sequence number of a second missed packet in the sequence, where the second reordering timer is initiated prior to expiration of the first reordering timer. When the first reordering timer expires, the UE may flush from a storage buffer, to one or more higher layers, successfully received packets having sequence numbers occurring before and continuing up to the first missing packet sequence number and any additional successfully received packets having consecutive sequence numbers thereafter up to the next missing sequence number. The UE may operate similarly for the second reordering timer that may be initiated before the first reordering timer expires. The UE may thus initiate, even before a previously initiated reordering timer expires, one or more subsequent reordering timers keyed to each missing sequence number for causing regular flushing of its storage buffer of successfully received packets to the higher layer when each respective timer expires and to prevent lengthy buffering of successfully received packets when one of the links is impacted.

In some examples, the UE may sequentially implement multiple reordering timers one after another (e.g., not simultaneously), and the time duration of each subsequent timer may decrease as compared to the prior reordering timer (e.g., a second reordering timer may have a shorter time duration than a first reordering timer, and so on). Progressively shortening of subsequent timers may cause regular flushing of successfully received packets to the higher layer and prevent lengthy buffering of successfully received packets before flushing when one of the links is impacted. If no packets in the sequence are missed during a particular reordering timer (e.g., because of how short the current reordering timer duration is), the UE may reset the reordering timer duration back to a longer duration (e.g., the initial reordering timer duration). By utilizing multiple reordering timers simultaneously, or by using reordering timers having different durations, the UE may support more efficient use of memory, improved throughput, decreased delays, and improved user experience.

A method for wireless communications at a wireless device is described. The method may include receiving a set of multiple packets having a sequential order, initiating a first PDCP reordering timer based on a first time stamp corresponding to unsuccessful decoding of a first packet in the sequential order, and initiating, prior to expiration of the first PDCP reordering timer, a second PDCP reordering timer based on a second time stamp corresponding to unsuccessful decoding of a second packet in the sequential order.

An apparatus for wireless communications at a wireless device is described. The apparatus may include a processor, memory coupled with the processor, and instructions stored in the memory. The instructions may be executable by the processor to cause the apparatus to receive a set of multiple packets having a sequential order, initiate a first PDCP reordering timer based on a first time stamp corresponding to unsuccessful decoding of a first packet in the sequential order, and initiate, prior to expiration of the first PDCP reordering timer, a second PDCP reordering timer based on a second time stamp corresponding to unsuccessful decoding of a second packet in the sequential order.

Another apparatus for wireless communications at a wireless device is described. The apparatus may include means for receiving a set of multiple packets having a sequential order, means for initiating a first PDCP reordering timer based on a first time stamp corresponding to unsuccessful decoding of a first packet in the sequential order, and means for initiating, prior to expiration of the first PDCP reordering timer, a second PDCP reordering timer based on a second time stamp corresponding to unsuccessful decoding of a second packet in the sequential order.

A non-transitory computer-readable medium storing code for wireless communications at a wireless device is described. The code may include instructions executable by a processor to receive a set of multiple packets having a sequential order, initiate a first PDCP reordering timer based on a first time stamp corresponding to unsuccessful decoding of a first packet in the sequential order, and initiate, prior to expiration of the first PDCP reordering timer, a second PDCP reordering timer based on a second time stamp corresponding to unsuccessful decoding of a second packet in the sequential order.

Some examples of the method, apparatuses, and non-transitory computer-readable medium described herein may further include operations, features, means, or instructions for receiving control signaling indicating a duration of the first PDCP reordering timer.

In some examples of the method, apparatuses, and non-transitory computer-readable medium described herein, receiving the set of multiple packets may include operations, features, means, or instructions for receiving a first subset of the set of multiple packets via a first wireless communications link and receiving a second subset of the set of multiple packets via the first wireless communications link or a second wireless communications link.

Some examples of the method, apparatuses, and non-transitory computer-readable medium described herein may further include operations, features, means, or instructions for storing one or more packets of the first subset of the set of multiple packets in a first queue and storing one or more packets of the second subset of the set of multiple packets in a second queue.

In some examples of the method, apparatuses, and non-transitory computer-readable medium described herein, the one or more packets of the first subset of the set of multiple packets, the one or more packets of the second subset of the set of multiple packets, or both, may have sequence numbers higher than the first packet.

In some examples of the method, apparatuses, and non-transitory computer-readable medium described herein, the first wireless communications link is a first radio bearer of a split radio bearer that operates in accordance with a first radio access technology, and the second wireless communications link is a second radio bearer of the split radio bearer that operates in accordance with the first wireless communications link or a second radio access technology.

Some examples of the method, apparatuses, and non-transitory computer-readable medium described herein may further include operations, features, means, or instructions for removing, from a buffer of the wireless device upon expiration of the first PDCP reordering timer, a first subset of packets having a sequence number in the sequential order that may be lower than the first packet.

Some examples of the method, apparatuses, and non-transitory computer-readable medium described herein may further include operations, features, means, or instructions for removing, from the buffer of the wireless device upon expiration of the first PDCP reordering timer, a second subset of packets having consecutive sequence numbers in the sequential order higher than the first packet and having sequence numbers in the sequential order lower than the second packet.

Some examples of the method, apparatuses, and non-transitory computer-readable medium described herein may further include operations, features, means, or instructions for removing, from a buffer of the wireless device upon expiration of the second PDCP reordering timer, a first subset of packets having a sequence number in the sequential order higher than the first packet and lower than the second packet.

Some examples of the method, apparatuses, and non-transitory computer-readable medium described herein may further include operations, features, means, or instructions for removing, from the buffer of the wireless device upon expiration of the second PDCP reordering timer, a second subset of packets having consecutive sequence numbers higher than the second packet.

Some examples of the method, apparatuses, and non-transitory computer-readable medium described herein may further include operations, features, means, or instructions for initiating, prior to expiration of the first PDCP reordering timer, the second PDCP reordering timer, or both, a third PDCP reordering timer based on a third time stamp corresponding to unsuccessful decoding of a third packet.

Some examples of the method, apparatuses, and non-transitory computer-readable medium described herein may further include operations, features, means, or instructions for receiving the first packet during a duration of the first PDCP reordering timer and removing the first PDCP reordering timer from a queue of PDCP reordering timers including the first reordering timer and the second PDCP reordering timer.

A method for wireless communications at a wireless device is described. The method may include receiving control signaling indicating a time duration of a first PDCP reordering timer, receiving a set of multiple packets having a sequential order, initiating a first PDCP reordering timer based on a first time stamp corresponding to unsuccessful decoding of a first packet in the sequential order, and initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

An apparatus for wireless communications at a wireless device is described. The apparatus may include a processor, memory coupled with the processor, and instructions stored in the memory. The instructions may be executable by the processor to cause the apparatus to receive control signaling indicating a time duration of a first PDCP reordering timer, receive a set of multiple packets having a sequential order, initiate a first PDCP reordering timer based on a first time stamp corresponding to unsuccessful decoding of a first packet in the sequential order, and initiate, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

Another apparatus for wireless communications at a wireless device is described. The apparatus may include means for receiving control signaling indicating a time duration of a first PDCP reordering timer, means for receiving a set of multiple packets having a sequential order, means for initiating a first PDCP reordering timer based on a first time stamp corresponding to unsuccessful decoding of a first packet in the sequential order, and means for initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

A non-transitory computer-readable medium storing code for wireless communications at a wireless device is described. The code may include instructions executable by a processor to receive control signaling indicating a time duration of a first PDCP reordering timer, receive a set of multiple packets having a sequential order, initiate a first PDCP reordering timer based on a first time stamp corresponding to unsuccessful decoding of a first packet in the sequential order, and initiate, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

In some examples of the method, apparatuses, and non-transitory computer-readable medium described herein, receiving the set of multiple packets may include operations, features, means, or instructions for receiving a first subset of the set of multiple packets via a first wireless communications link and receiving a second subset of the set of multiple packets via the first wireless communications link or a second wireless communications link.

Some examples of the method, apparatuses, and non-transitory computer-readable medium described herein may further include operations, features, means, or instructions for storing one or more packets of the first subset of the set of multiple packets in a first queue and storing one or more packets of the second subset of the set of multiple packets in a second queue.

In some examples of the method, apparatuses, and non-transitory computer-readable medium described herein, the one or more packets of the first subset of the set of multiple packets, the one or more packets of the second subset of the set of multiple packets, or both, may have sequence numbers higher than the first packet.

In some examples of the method, apparatuses, and non-transitory computer-readable medium described herein, the first wireless communications link is a first radio bearer of a split radio bearer that operates in accordance with a first radio access technology, and the second wireless communications link is a second radio bearer of the split radio bearer that operates in accordance with the first radio access technology or a second radio access technology.

Some examples of the method, apparatuses, and non-transitory computer-readable medium described herein may further include operations, features, means, or instructions for removing, from a buffer of the wireless device upon expiration of the first PDCP reordering timer, a first subset of packets having a sequence number in the sequential order lower than the first packet.

Some examples of the method, apparatuses, and non-transitory computer-readable medium described herein may further include operations, features, means, or instructions for removing, from the buffer of the wireless device upon expiration of the first PDCP reordering timer, a second subset of packets having consecutive sequence numbers in the sequential order higher than the first packet and having sequence numbers in the sequential order lower than the second packet.

Some examples of the method, apparatuses, and non-transitory computer-readable medium described herein may further include operations, features, means, or instructions for removing, from a buffer of the wireless device upon expiration of the second PDCP reordering timer, a first subset of packets having a sequence number in the sequential order higher than the first packet and lower than the second packet.

Some examples of the method, apparatuses, and non-transitory computer-readable medium described herein may further include operations, features, means, or instructions for removing, from the buffer of the wireless device upon expiration of the second PDCP reordering timer, a second subset of packets having consecutive sequence numbers in the sequential order higher than the second packet.

Some examples of the method, apparatuses, and non-transitory computer-readable medium described herein may further include operations, features, means, or instructions for initiating, subsequent to expiration of the second PDCP reordering timer, a third PDCP reordering timer based on a third time stamp corresponding to unsuccessful decoding of a third packet in the sequential order, the third PDCP reordering timer being shorter than the second PDCP reordering timer.

Some examples of the method, apparatuses, and non-transitory computer-readable medium described herein may further include operations, features, means, or instructions for modifying the second PDCP reordering timer based on determining that a memory threshold may be satisfied and initiating the modified second PDCP reordering timer based on a third time stamp different than the second time stamp.

Some examples of the method, apparatuses, and non-transitory computer-readable medium described herein may further include operations, features, means, or instructions for identifying, upon expiration of the second PDCP reordering timer, that the second packet was unsuccessfully decoded and initiating a second instance of the first PDCP reordering timer based on a third time stamp corresponding to unsuccessful decoding of a third packet in the sequential order.

Some examples of the method, apparatuses, and non-transitory computer-readable medium described herein may further include operations, features, means, or instructions for initiating, subsequent to expiration of the first PDCP reordering timer, a third PDCP reordering timer based on a fourth time stamp corresponding to unsuccessful decoding of a fourth packet in the sequential order, the third PDCP reordering timer being shorter than the first PDCP reordering timer.

In some examples of the method, apparatuses, and non-transitory computer-readable medium described herein, the third PDCP reordering timer may be the same as the first PDCP reordering timer or different than the first PDCP reordering timer.

DETAILED DESCRIPTION

Figure 1:
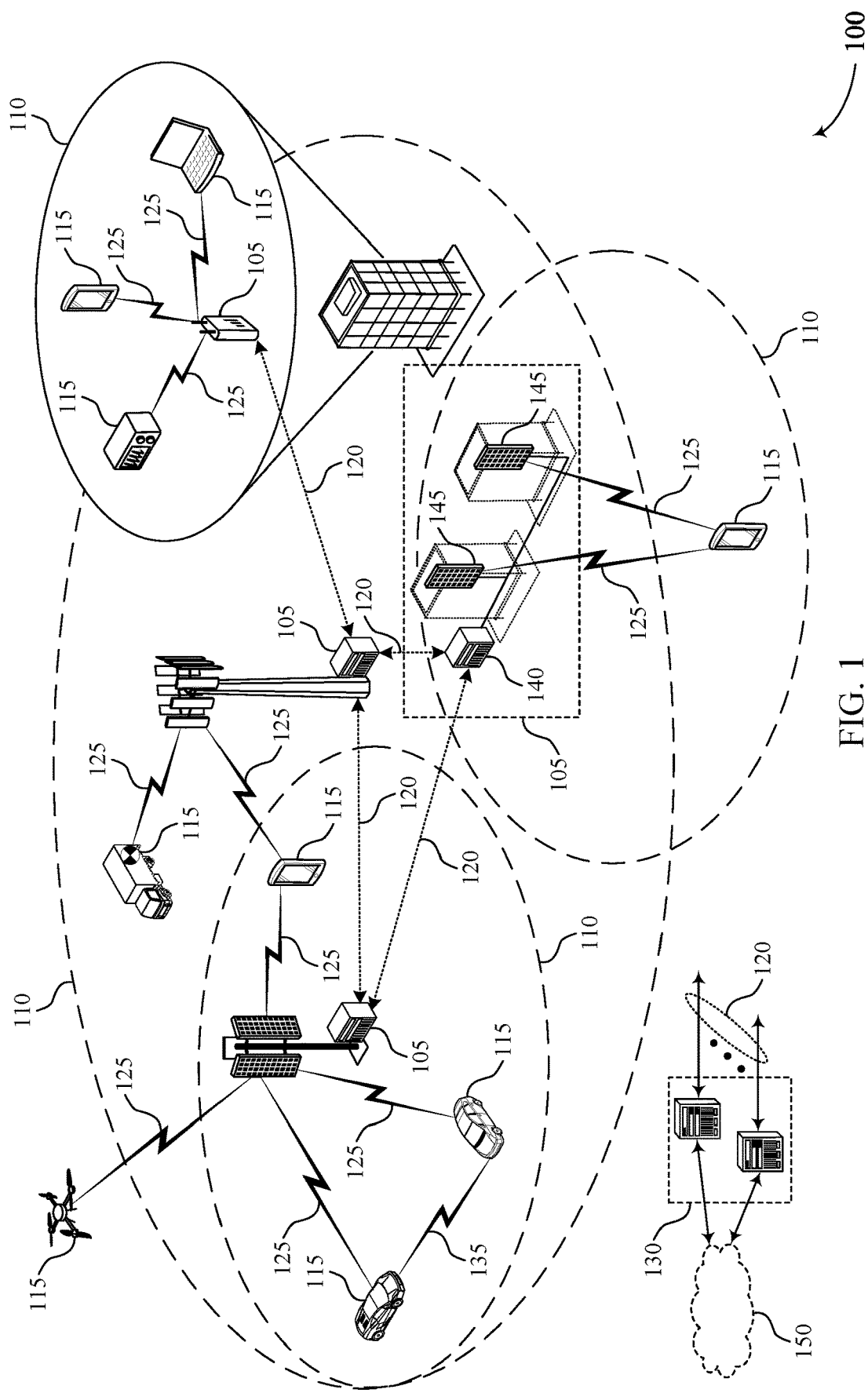
FIG. 1 illustrates an example of a wireless communications system that supports multiple timers for effective reordering in accordance with aspects of the present disclosure.

A wireless communications system may support multiple radio access technologies (RATs) including 4G systems, such as 4G LTE, as well as 5G systems, which may be referred to as 5G NR. Some devices in the wireless communications system may be capable of supporting simultaneous communication using the different RATs.

In some cases, a receiving wireless device (e.g., a UE) may communicate with one or more transmitting device (e.g., base stations) via a NR packet data convergence protocol (PDCP) split radio bearer. The UE may receive packets (e.g., packet data units (PDUs)) on one or more links (e.g., a single link, such as an NR link, two links, such as an LTE link and an NR link, etc.). Each received packet may be associated with a sequence number. The transmitting devices may transmit packets in a sequential order (e.g., in ascending order of sequence numbers). The UE may receive the packets and decode them in order based on the sequence numbers and may utilize a reordering timer (e.g., a packet data convergence protocol (PDCP) reordering timer) when any of the packets in the sequence are not received. In some cases, some of the packets in a set of packets may be sent over a first link using a first radio access technology (RAT) (e.g., an LTE link or a first NR link) and other packets in the set of packets may be sent over a second link using the first RAT or a second RAT (e.g., an NR link). For example, the base station may transmit a first subset of the sequential packets on the first link and a second subset of the sequential packets on the second link.

In some cases, the UE may communicate using a single RAT (e.g., an NR link) and one or more packets may not be received in sequential order (e.g., due to decoding failure of a message, a hybrid automatic repeat request (HARQ) message, or the like). For instance, some PDCP sequence numbers may be missing due to decoding failure of one HARQ while another HARQ passes (e.g., in which case, a reordering timer may start, as described herein). In some cases, a UE utilizing a split radio bearer may experience communication imbalances across different links (e.g., may receive one or more packets out of sequential order). For instance, communications on the different links (e.g., using different RATs) may have different timing, different reliability, different block error rate (BLER), or the like. In some cases, the UE may successfully receive some or all packets transmitted on the first link, but may miss or otherwise be unable to decode many or all packets on the second link due to noise and/or interference experienced by the second link, timing differences between the links, or the like. The UE may buffer the successfully received packets and initiate a reordering timer while monitoring for retransmission of the missed packets.

However, conventional reordering timer techniques may initiate a single reordering timer for each missing sequence number, where a next reordering timer does not begin until the prior timer expires. Only consecutively initiating each reordering timer results in increased latency when packets are frequently missed, such as when one link is impacted. For example, due to the differing channel conditions experienced by the two links, the UE may successfully receive a large number of packets on one of the links while not being able to successfully packets communicated via the other link. This may result in increased latency and buffer utilization while attempting to recover the packets on the noisy link. For example, the UE may buffer the successfully received packets while attempting to recover the missed packets, resulting in high buffer utilization. Compounding this issue is that the reordering timer is keyed to each missed packet. After a first timer expires, the UE moves to the next missed packet in the sequence and initiates a second reordering timer.

Waiting for a prior reordering timer to expire before initiating a subsequent reordering timer for a next identified missing packet may result in increased latency and buffering a large number of successfully received packets on the other link. For example, upon expiration of a first reordering timer, the UE may have to buffer up to twice the size of the reordering timer worth of packets (e.g., may have to buffer the packets received via the higher performing link while waiting for transmission of packets on the lower performing link). Excessive buffering at the UE may utilize a large amount of memory available for both uplink and downlink communications, which may result in decreased uplink performance (e.g., due to memory expenditures for the downlink), decreased throughput, inefficient use of computational resources, increased system delays, and reduced user experience.

Techniques described herein relate to utilizing multiple reordering timers to more efficiently perform reordering operations and reduce memory footprint. In some cases, a UE may utilize multiple reordering timers simultaneously. For instance, the UE may initiate a first reordering timer keyed to a first missing sequence number, and may initiate a second reordering timer keyed to a second missing sequence number during the duration of the first reordering timer. When the first reordering timer expires, or upon receiving the missing sequence number, the UE may flush (e.g., send to one or more higher layers) all packets up to the missing packet sequence number and any additional packets with consecutive sequence numbers above the missing packet sequence number up to the next expected sequence number. The UE may append and remove reordering timers, to and from a reordering timer queue, for multiple identified missing sequence numbers, resulting in more efficient use of memory, improved throughput, decreased delays, and improved user experience.

In some examples, the UE may sequentially implement multiple timers one after another (e.g., not simultaneously), where the duration of each subsequent timer may decrease over time as compared to the prior timer (e.g., a second reordering timer may have a shorter duration than a first reordering timer, and so on). In such cases, if no packets are missing during a particular reordering timer (e.g., because of how short the reordering timer duration is), the wireless device may reset the timer duration back to the initial reordering timer duration.

Aspects of the disclosure are initially described in the context of wireless communications systems. Aspects of the disclosure are then described in the context of a protocol stack, timelines, and process flows. Aspects of the disclosure are further illustrated by and described with reference to apparatus diagrams, system diagrams, and flowcharts that relate to multiple timers for effective reordering.

FIG. 1 illustrates an example of a wireless communications system 100 that supports multiple timers for effective reordering in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the wireless communications system 100 may support simultaneous communication using different RATs in stand-alone (SA) operation and non-stand-alone (NSA) operation. In SA operation, a gNB (e.g., the base station 105-b) is connected to a 5G Core Network (5GC). NSA operation may integrate an eNB and a gNB (e.g., base stations 105) to provide dual connectivity for the UE 115. In an example, in 5G NSA mode, the network may establish a secondary cell group (SCG) bearer (e.g., NR packet data convergence protocol (PDCP)/NR radio link control (RLC)/NR MAC)) or a split bearer (e.g., NR PDCP/NR RLC/NR MAC+LTE RLC/LTE MAC). In another example, in 5G SA mode, the network may establish an SCG bearer (e.g., FR1 or FR2) or a split bearer (e.g., LTE+NR, FR1+FR2).

In some cases, a UE 115 may support simultaneous communication using different RATs (e.g., via NR PDCP split bearers), or may support communications on a single RAT (e.g., NR in a standalone (SA) system). In examples where the UE communicates via a single RAT (e.g., NR), the UE may fail to receive or decode one or more packets in sequential order. In such examples, the UE may initiate one or more reordering timers (e.g., PDCP reordering timers), as described herein. In some examples, the UE may communicate via multiple RATs. For instance, one or more transmitting devices (e.g., base stations) may transmit packets in a sequential order on separate links (e.g., via the different RATs). For instance, each packet may be associated with a sequence number. However, in some examples, one of the links may experience different SNR, different timing, different BLER, or the like. In such examples, the UE 115 may not receive or successfully decode one or more of the packets in the sequential order may not be received. In cases where one link is particularly noisy or experiencing high interference, the UE 115 may receive many or all packets in a sequential order on one link, but may not receive or decode some or all packets on the second link.

Upon determining that a packet in a sequence of packets is missing (where the sequence number of the missing packet is also referred to as a hole in the sequence), the UE 115 may initiate the reordering timer. After a reordering timer (e.g., t-reordering) is initiated, the UE 115 may monitor for a retransmission of the missing packet before the timer expires. In some examples, only one reordering timer per receiving packet entity may be running at a given time, under constraints in some conventional systems. Reordering procedures for reordering timers may be defined by the following parameters. RX_DELIV may refer to a state variable indicating a count value of a first PDCP service data unit (SDU) not delivered to upper layers, but not yet received. The initial value for RX_DELIV may be 0. RX_REORD may refer to a state variable indicating a count value following the count value associated with the packet (e.g., PDCP data PDU) which triggered the reordering timer (t-reordering). T-reordering may refer to a reordering timer, and may be used to detect the loss of PDCP data PDUs. If the reordering timer (e.g., t-reordering) is running, then the UE may not start an instance of the reordering timer (e.g., t-reordering). That is, in some conventional systems if a first t-reordering is running, the UE 115 may not support initiating a second t-reordering during the duration of the first t-reordering. In such examples, only one t-reordering per receiving PDCP entity may be running at a given time. RX NEXT may refer to a state variable indicating a count value of a next PDCP SDU expected to be received in the sequence of packets. The initial value of RX NEXT may be 0.

In some examples, a UE may establish two or more wireless communication links and may respectively communicate a sequence of packets over the two links. In some cases, one of the links may experience noisier conditions as compared to the other link, resulting in several packets in the sequence being lost during transport via the noisy link and a storage buffer of the UE having to buffer the successfully received packets. In some examples, a UE may initiate a first reordering timer keyed to a sequence number of a first missed packet in the sequence, and may initiate a second reordering timer keyed to a sequence number of a second missed packet in the sequence, where the second reordering timer is initiated prior to expiration of the first reordering timer. When the first reordering timer expires, the UE may flush from a storage buffer, to one or more higher layers, successfully received packets having sequence numbers occurring before and continuing up to the first missing packet sequence number and any additional successfully received packets having consecutive sequence numbers thereafter up to the next missing sequence number. The UE may operate similarly for the second reordering timer that may be initiated before the first reordering timer expires. The UE may thus initiate, even before a previously initiated reordering timer expires, one or more subsequent reordering timers keyed to each missing sequence number for causing regular flushing of its storage buffer of successfully received packets to the higher layer when each respective timer expires and to prevent lengthy buffering of successfully received packets when one of the links is impacted.

In some examples, the UE may sequentially implement multiple reordering timers one after another (e.g., not simultaneously), and the time duration of each subsequent timer may decrease as compared to the prior reordering timer (e.g., a second reordering timer may have a shorter time duration than a first reordering timer, and so on). Progressively shortening of subsequent timers may cause regular flushing of successfully received packets to the higher layer and prevent lengthy buffering of successfully received packets before flushing when one of the links is impacted. If no packets in the sequence are missed during a particular reordering timer (e.g., because of how short the current reordering timer duration is), the UE may reset the reordering timer duration back to a longer duration (e.g., the initial reordering timer duration).

Figure 2:
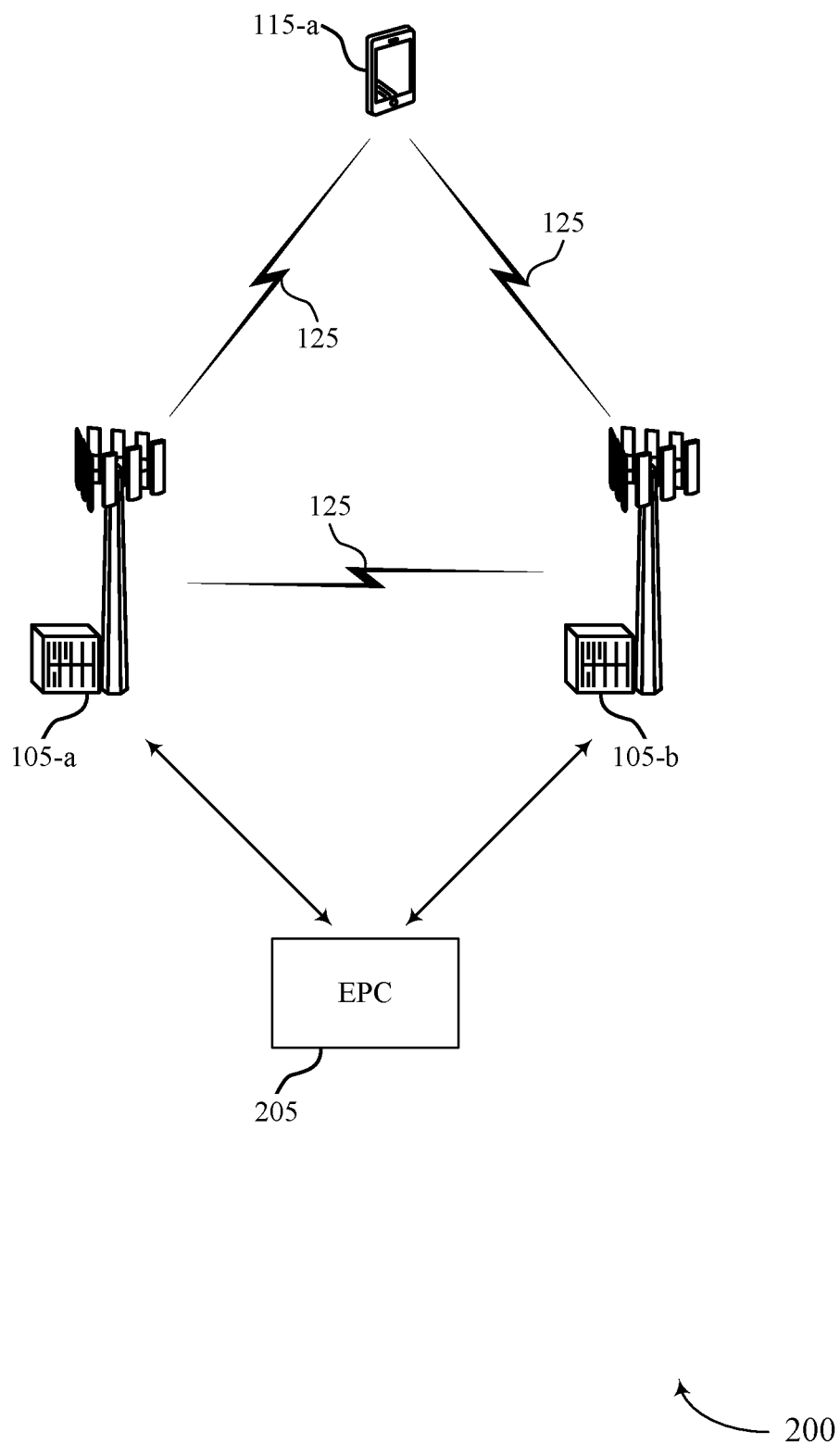
FIG. 2 illustrates an example of a wireless communications system that supports multiple timers for effective reordering in accordance with aspects of the present disclosure.

FIG. 2 illustrates an example of a wireless communications system 200 that supports multiple timers for effective reordering in accordance with aspects of the present disclosure. In some examples, wireless communications system 200 may implement aspects of wireless communications system 100. For example, wireless communications system 200 may include a UE 115-*a*, a base station 105-*a*, and a base station 105-*b* which may be examples of a UE 115 and a base station 105 as described with reference to FIG. 1.

The UE 115-*a*, the base station 105-*a*, and the base station 105-*b* may communicate via communication links 125 (as described with reference to FIG. 1). The wireless communications system 200 may support multiple radio access technologies including 4G systems (e.g., LTE systems, LTE-A systems, or LTE-A Pro systems, or the like) and 5G systems (e.g., which may be referred to as NR systems). The wireless communications system 200 may support single connectivity or dual connectivity. In some example, the wireless communications system 200 may support E-UTRAN New Radio-Dual Connectivity (EN-DC) (e.g., LTE-NR dual connectivity). In an example of dual connectivity, the UE 115-*a* may support simultaneous transmission and reception of data on multiple component carriers from a first cell group (e.g., an MCG) and a second cell group (e.g., an SCG). The two cell groups can be managed by different base stations (e.g., a NodeB, an eNB, a gNB, or the like). UE 115-*a* may thus support communications via multiple links 125 (e.g., using the same RAT or different RATs). The UE may support split communications across any number of links, RATs, etc.

The base station 105-*a* may be an eNB, while the base station 105-*b* may be a gNB. The base station 105-*a* may be configured to support 4G radio access technologies. For example, the base station 105-*a* may be an eNB capable of providing LTE/E-UTRA services to the UE 115-*a*. The base station 105-*b* may be configured to support 5G radio access technologies. For example, the base station 105-*b* may be a gNB capable of providing NR (e.g., 5G) user plane and control plane services to the UE 115-*a*. In some examples, both the base station 105-*a* and the base station 105-*b* may be configured to support the same radio access technologies. For example, in NR dual connectivity, the base station 105-*a* and the base station 105-*b* may be gNBs supporting 5G radio access technologies.

The wireless communications system 200 may include an evolved packet core (EPC) 205. The EPC 205 may be a 5GC. In some examples, the EPC 205 may determine whether the UE 115-*a* is authorized for dual connectivity access. In some aspects, the EPC 205 may support switching of radio bearers between gNBs (e.g., the base station 105-*b*)

and eNBs (e.g., the base station 105-*a*). The EPC 205 may include examples of aspects of the core network 130. In some examples, the wireless communications system 200 may be a packet-based wireless communications system that operates according to a layered protocol stack. The UE 115-*a* may be configured to support dual connectivity according to a protocol stack, in which the UE 115-*a* is connected to multiple cells (e.g., two cell groups), such as a master cell group (MCG) associated with the base station 105-*a* and a secondary cell group (SCG) associated with the base station 105-*b*.

The wireless communications system 200 may support stand-alone (SA) operation and non-stand-alone (NSA) operation. In SA operation, a gNB (e.g., the base station 105-*b*) is connected to a 5G Core Network (5GC). NSA operation may integrate the eNB (e.g., the base station 105-*a*) and the gNB (e.g., base station 105-*b*) to provide dual connectivity for the UE 115-*a*. In an example, in 5G NSA mode, the network may establish a SCG bearer (e.g., NR packet data convergence protocol (PDCP)/NR radio link control (RLC)/NR MAC)) or a split bearer (e.g., NR PDCP/NR RLC/NR MAC+LTE RLC/LTE MAC). In another example, in 5G SA mode, the network may establish an SCG bearer (e.g., FR1 or FR2) or a split bearer (e.g., LTE+NR, FR1+FR2). Examples of protocols and split bearers are described in greater detail with reference to FIG. 3.

In some cases, a UE 115-*a* may receive packets of a set of packets over multiple links in a split-bearer scenario. In such examples, communications on the different links (e.g., using the different RATs) may have different timing, different reliability, different BLER, or the like. In some cases, the UE 115-*a* may receive many or all packets transmitted on the first link, but may miss many or all packets on the second link due to noise and/or interference experienced by the second link, but not experienced by the first link. The UE 115-*a* may buffer the received packets and initiate a reordering timer (e.g., a PDCP reordering timer) while requesting the missed packets. Because conventional reordering timer techniques start a single reordering timer at each hole, one after another without overlapping in time, the UE 115-*a* may have to buffer up to twice the size of the reordering timer worth of packets when only one of the links is working properly (e.g., buffer the packets received via the LTE link while waiting for transmission of the NR packets, or vice versa). For example, for speeds in excess of 1 Gbps, and assuming a reordering timer may be configured at 100 ms with a one-to-one split between the links, twice the reordering timer worth of data buffer may be equal to 12.5 MB of memory. Excessive buffering at the UE 115-*a* may utilize a large amount of memory for both uplink and downlink communications, which may result in decreased uplink performance, decreased throughput, inefficient use of computational resources, increased system delays, and reduced user experience.

For instance, in some non-limiting illustrative examples, the packets (e.g., PDCP PDUs) in a set of packets with even sequence numbers (e.g., 0, 2, 4, 6, and so on) may be sent over a first link 125 (e.g., an LTE link) and the packets in the set of packets with odd sequence numbers (e.g., 1, 3, 5, 7, and so on) may be sent over a second link 125 (e.g., an NR link). In some cases, on an NR link, RLC sequence numbers may be consecutive. That is, one RLC sequence number may be mapped to one packet sequence number. In some other cases, on an LTE link, one RLC sequence number may be mapped to multiple packet sequence numbers. In some cases, the UE 115-*a* may only receive the even packets over the first link due to poor radio conditions on the second link preventing UE 115-*a* from being able to decode the odd packets communicated via the second link. That is, the UE 115-*a* may only receive packets with even sequence numbers, and the holes in the sequence may be caused by the missing packets with odd sequence numbers.

For example, the UE 115-*a* may receive a packet with the sequence number 0 (e.g., at a time T) and then may receive a packet with, or associated with, the sequence number 2 (e.g., at a time T+1 ms). Since a packet with the sequence number 1 was not received before the packet with sequence number 2 was received (e.g., because the UE 115-*a* is not receiving the second link carrying odd sequence number packets), the UE 115-*a* may start a reordering timer for a duration of 100 ms (e.g., with RX_REORD set to 2) key to the time the packet with sequence number 2 was expected to have been received. As conditions are better on the other link, the UE 115-*a* potentially may receive each packet with an even sequence number up to a sequence number of 202 (e.g., at a time T+101 ms) while the reordering timer is running. In some cases, the first reordering timer may expire without receiving the packet with the sequence number 1 (e.g., at a time T+101 ms) and the UE 115-*a* may deliver the buffered packet with the sequence number 2 to the upper layer (e.g., with RX_DELIV set to 3) along with any successfully received packets having consecutive numbers occurring after sequence number 2. In this example, however, since the packet with sequence number 3 is missing (e.g., was not properly decoded or received via the NR link), the UE 115-*a* does not have any consecutive packets after sequence number 2 to deliver to the upper layer (e.g., the UE 115-*a* may deliver only sequence number 2 to the higher layer).

Continuing this example, because the packet with the sequence number 3 is missing (e.g., RX_REORD set to 203), the UE 115-*a* may start a second reordering timer (e.g., at a time T+101 ms) upon the expiration of the first reordering timer to permit the UE 115-*a* to attempt to recover the packet with sequence number 3. In this scenario where the odd packets are not being received due to poor conditions on the NR link, before the second reordering timer expires (e.g., at a time T+200 ms), the UE 115-*a* potentially may buffer up to all of the received even packets from sequence number 4 all the way up to sequence number 400 (e.g., because conventional reordering timer techniques start a single reordering timer at each hole, and the reordering timers do not overlap in time), which may cause the buffer to store almost twice the reordering timer (e.g., 100 ms) worth of data. The UE 115-*a* may have a limited amount of total available memory for both uplink and downlink signaling. Buffering a large proportion of the packets successfully received on one link, while attempting to recover the missed packets on the impacted link, may result in high buffer utilization when the reordering buffer is operated consecutively as done conventionally. Moreover, if the UE 115-*a* utilizes a larger portion of available memory for the increased buffering for downlink signaling, the UE 115-*a* may have less available memory for uplink signaling. This may result in decreased throughput on the uplink, decreased availability and efficient use of computational resources, increased latency, and reduced user experience.

To address at least this problem, the UE 115-*a* may simultaneously utilize multiple reordering timers to more efficiently perform reordering operations and reduce memory footprint. In some cases, some of the packets in a set of sequential packets may be sent over a first link (e.g., an LTE link) from the base station 105-*a* and others of the packets in the set may be sent over a second link (e.g., an NR link) from the base station 105-b. In some cases, a UE 115-a may initiate a first reordering timer keyed to a sequence number of a first missing packet, and may initiate a second reordering timer keyed to a sequence number of a second missing packet, wherein the second reordering timer is initiated prior to expiration of the first reordering timer. When the first reordering timer expires, the UE may flush from a storage buffer, to one or more higher layers, successfully received packets having sequence numbers occurring before and continuing up to the first missing packet sequence number and any additional successfully received packets having consecutive sequence numbers thereafter up to the next missing sequence number. The UE may operate similarly for the second reordering timer that may be initiated before the first reordering timer expires. The UE may thus initiate, even before a previously initiated reordering timer expires, one or more subsequent reordering timers keyed to each missing sequence number for causing regular flushing of its storage buffer of successfully received packets to the higher layer when each respective timer expires and to prevent lengthy buffering of successfully received packets when one of the links is impacted.

In some examples, the UE may sequentially implement multiple reordering timers one after another (e.g., not simultaneously), and the time duration of each subsequent timer may decrease as compared to the prior reordering timer (e.g., a second reordering timer may have a shorter time duration than a first reordering timer, and so on). Progressively shortening of subsequent timers may cause regular flushing of successfully received packets to the higher layer and prevent lengthy buffering of successfully received packets before flushing when one of the links is impacted. If no packets in the sequence are missed during a particular reordering timer (e.g., because of how short the current reordering timer duration is), the UE may reset the reordering timer duration back to a longer duration (e.g., the initial reordering timer duration).

Figure 3:
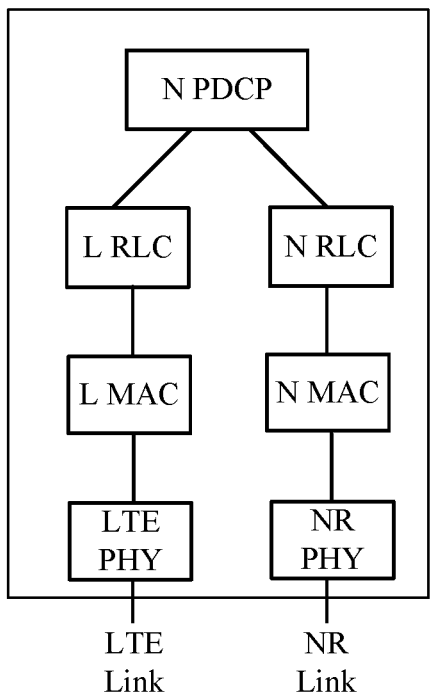
FIG. 3 illustrates an example of a protocol stack that supports multiple timers for effective reordering in accordance with aspects of the present disclosure.

FIG. 3 illustrates an example of a protocol stack 300 that supports multiple timers for effective reordering in accordance with aspects of the present disclosure. FIG. 3 further illustrates a protocol stack 301 that supports multiple timers for effective reordering in accordance with aspects of the present disclosure. Protocol stack 300 and protocol stack 301 may support a split bearer, as described in greater detail with reference to FIG. 2.

The protocol stack 300 may include various protocol layers. The different protocol layers may support different links (e.g., via different RATs or the same RAT). For instance, a first aspect of protocol stack 300 may support an LTE link and a second aspect of protocol stack 300 may support an NR link. For example, a UE 115 may communicate with one or more base stations via a first link (e.g., an LTE link) via a PDCP layer (e.g., an NR PDCP layer), an L RLC layer, an L MAC layer, and an L Physical (PHY) layer. The UE 115 may simultaneously communicate with one or more base stations via a second link (e.g., an NR link) via the PDCP layer (e.g., the NR PDCP layer), an NR MAC layer, and an NR physical layer (PHY). In some example, the UE 115 may communicate via two links that use the same RAT (e.g., two NR links via one protocol stack, two protocol stacks, or two separate aspects of a protocol stack. Each of these layers (entities) may be in communication with one another (e.g., via one or more radio bearers, logical channels, transport channels, etc.). With reference to FIG. 2, the UE 115-a may be configured to support transfer of upper layer data units (e.g., PDCP data PDUs) over one or multiple radio bearers. A radio bearer may be configured per cell group, for example, an MCG bearer and an SCG bearer. In some examples, a split bearer may be configured for both cell groups and handled by both cell groups, such as for both the MCG associated with a primary base station 105 (e.g., base station 105-a) and an SCG associated with a secondary base station 105 (e.g., base station 105-b).

In some examples, the one or more base stations may transmit some packets in sequential order on the first link (e.g., the LTE link), and other packets in a sequential order on a second link (e.g., the NR link). Sequence numbers may refer to PDCP sequence numbers (e.g., RLC sequence numbers may be consecutive on each link, while PDCP sequence numbers are not). In such examples, the one or more base stations may transmit packets having even sequence numbers (e.g., PDCP sequence numbers 0, 2, 4, 6, 8 . . . 398, 400, etc.) on the LTE link and packets having odd sequence numbers (e.g., sequence numbers 1, 3, 5, etc.) on the NR link. However, in some examples, one of the links (e.g., the NR link) may suffer a higher BLER, a higher SNR, may have different timing than the LTE link, or the like. In some examples, although the UE 115 may receive most or all of the sequential packets having even sequence numbers of the LTE link, the UE 115 may not receive or may not be able to successfully decode some or all of the sequential packets transmitted on the NR link.

Continuing with this example, the UE 115 may receive a packet having sequence number 0 (e.g., RLC sequence number 0 and PDCP sequence number 0) at a first time T ms, a second packet having a sequence number 2 (e.g., RLC sequence number 1 and PDCP sequence number 2) at time T+1 ms, a third packet having a sequence number 4 (e.g., RLC sequence number 2 and PDCP sequence number 4) at time T+2 ms, and packets having sequence numbers 6 and 7 (e.g., an RLC sequence number 3 and PDCP packet numbers 6 and 7) at time T+3 ms. However, the UE 115 may not receive or may not be able to decode any packets having odd sequence numbers (e.g., odd PDCP sequence numbers) on the NR link.

In some examples, for the LTE link, one RLC sequence number may map to multiple PDCP sequence numbers. For the NR link, each PDCP sequence number may map to a single RLC sequence number. Continuing with this example, the UE 115 may identify a hole in the sequence (e.g., a missing packet with PDCP sequence number 1). In such examples, the UE 115 may initiate a reordering timer (e.g., a PDCP reordering timer, t-reordering) at time T+1 ms with a value of RX_DELIV set of 1 (e.g., the next undelivered but waited for sequence number), and RX_REORD set to 2 (e.g., the next sequence number after the hole in the sequence). The reordering timer may run for a predetermined or configured amount of time (e.g., 100 ms). The UE 115 may continue to successfully receive the even packets (e.g., on the LTE link) during the 100 ms of the reordering timer, and at time T+101, the UE 115 may receive a packet having a sequence number 202 (e.g., an RLC sequence number 101, and a PDCP sequence number 202). In this example, the UE 15 may have identify a second sequence hole (e.g., second missing packet having a PDCP sequence number 3). Upon expiration of the first reordering timer, the UE 115 may flush received packets having sequence numbers up to RX_REORD (e.g., the packet having sequence number 2) up to higher layers. After expiration of the first reordering timer (e.g., 100 ms later), the UE 115 may initiate a second reordering timer with RX_DELIV set to 3 (e.g., having recently flushed the packet having sequence number 2). The UE 115 may set RX_REORD to 203. That is, the UE 115 may initiate the second reordering timer triggered by the missing packet having the sequence number 3 (e.g., the second hole in the sequence). However, because the first reordering timer ran for 100 ms, the UE 115 may have received multiple packets, including packet associated with sequence number 202 prior to initiating the second reordering timer. Thus, the UE 115 may initiate the second reordering timer associated with the second hole in the sequence (e.g., sequence number 3) with RX_REORD set to 203.

The second reordering timer may expire 100 ms later. Prior to expiration of the second reordering timer (e.g., at T+200 ms), the UE 115 may have received up to all of the packets up to sequence number 400 (e.g., an RLC sequence number 200 and a PDCP sequence number 400). In such examples, due to the poor radio conditions on the NR link, the UE 115 may be buffering some or all of the even PDCP sequence numbers from 4 through 400, while attempting to recover the missing packet for sequence number 3. The asymmetric channel conditions on the two links results in excessive buffering and results in an increased memory footprint. The UE 115 may have a limited amount of total available memory for use in both uplink and downlink communications. Increased memory usage due to buffering for downlink communications (e.g., as a result of a poor-quality NR link and using no more than one reordering timer of fixed duration at a time) may result in less available memory for uplink communications, which may in turn result in increased latency, decreased throughput for the UE 115, increased system latency, less efficient use of available computational resources, and reduced user experience.

In some examples, as described in greater detail with reference to FIG. 5, the UE 115-*a* may sequentially implement multiple reordering timers one after another (e.g., not simultaneously), where the duration of each subsequent timer may decrease over time as compared to the prior timer (e.g., a second reordering timer may have a shorter duration than a first reordering timer, and so on). If no packets are missing during a particular reordering timer (e.g., because of how short the reordering timer duration is), the UE 115-*a* may reset the timer duration back to the initial reordering timer duration.

Figure 4:
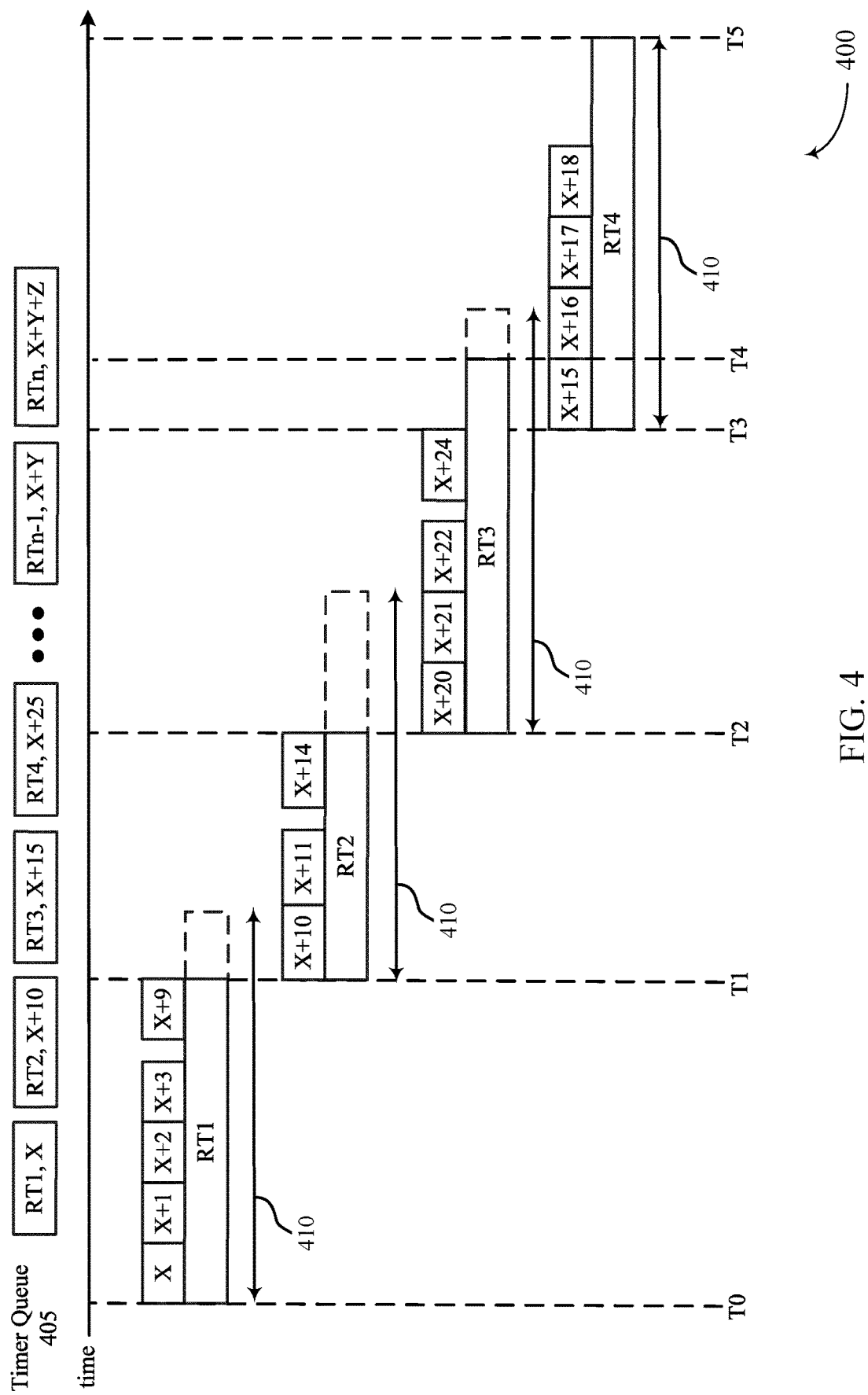
FIG. 4 illustrates an example of a timeline that supports multiple timers for effective reordering in accordance with aspects of the present disclosure.

FIG. 4 illustrates an example of a timeline 400 that supports multiple timers for effective reordering in accordance with aspects of the present disclosure. In some examples, timeline 400 may implement aspects of wireless communications system 100. For example, timeline 400 may be implemented by a UE 115-*a*, a base station 105-*a*, and a base station 105-*b* which may be examples of a UE 115 and a base station 105 as described with reference to FIGS. 1-3.

In some cases, a wireless device (e.g., a UE 115-*a*) may simultaneously utilize multiple reordering timers (e.g., PDCP reordering timers) to more efficiently perform reordering operations and reduce memory footprint. One or more base stations may transmit a set of sequential packets to the UE 115-*a*. In some cases, all of the packets in the set of sequential packets may be sent over a single (e.g., NR) link. In some cases, some of the packets in the set of sequential packets may be sent over a first link (e.g., an LTE link) and others of the packets in the set of sequential packets may be sent over a second link (e.g., an NR link), where unique subset of the packets are respectively sent via the two links. In some cases, each packet may be assigned a sequence number such that the UE 115-*a* may order the packets upon receipt regardless of which link is used to transmit each packet. In some cases, a UE 115-*a* may maintain separate packet queues (e.g., PDCP queues) for each of the first link and the second link. UE 115-*a* may initiate a first reordering timer keyed to a first missing sequence number, and may initiate a second reordering timer keyed to a second missing sequence number during the duration of the first reordering timer.

When needed, the UE 115-*a* may utilize multiple reordering timers (e.g., simultaneously). The UE may place each new timer in a timer queue. For each timer, UE 115-*a* may maintain a timer stamp at which the reordering timer is started, and a RX_REORD value. The UE 15-*a* may further maintain a single PDCP queue for packets received on a single link (e.g., on an NR link), or may maintain separate PDCP queue for each of the two links (e.g., an LTE link and an NR link, or two NR links, or the like) in cases where the UE communicates via two links. The head of the timer queue may expire one at a time, based on the ordering of the timer queue. For example, the sequence number of the missing packet may be placed at the head of the PDCP queue. Thus, timers corresponding to missing sequence numbers may expire one at a time, permitting the multiple reordering timers to correspond to each hole and expire one at a time.

When a timer in the timer queue expires, the UE 115-*a* may flush all received PDUs having sequence numbers up to RX_REORD of that timer, and all subsequent in-order PDUs up to RX NEXT thereafter. For example, the UE 115-*a* may flush received packets up to the RX_REORD of the sequence hole of an expired timer. If a packet having the sequence number of RX_REORD has been received, the UE 115-*a* may also flush any consecutive packets having higher sequence numbers than RX_REORD (e.g., including RX_REORD) between RX_REORD and RX NEXT (e.g., but not any packets that do not have consecutive sequence numbers between RX_REORD and RX NEXT).

At the end of each receive procedure, if at least one reordering timer is already running, and if a number of missing PDUs is not zero between RX_REORD of the last timer and RX NEXT, then UE 115-*a* may start a new timer with the time stamp set to the current time, and RX_REORD set to RX NEXT. The UE 115-*a* may append the new timer to the tail of the timer queue.

At any time, the UE 115-*a* may remove timers from the queue if RX_DELIV moves past (e.g., is higher than) the sequence number associated with the RX_REORD of that timer. For example, if the UE 115-*a* receives the missing packet having the sequence number associated with RX_REORD, then the UE 115-*a* may remove the timer associated with that RX_REORD from the timer queue. In some examples, the UE 115-*a* may remove a timer from the timer queue prior to expiration of that timer (e.g., if RX_DELIV moves past (e.g., is higher than) the sequence number associated with the RX_REORD of that timer).

As illustrated in FIG. 4, for example, a UE 115-*a* may maintain a timer queue 405. Each reordering timer (RT) of timer queue 405 may be appended to the tail of the timer queue 405. For each reordering timer in the timer queue 405, the UE 115-*a* may maintain an RX_REORD value. For example, a first reordering timer (RT1) at the head of the timer queue may have an RX_REORD X, the second RT (RT2) may have an RX_REORD X+10, and so on, as described herein. An illustrative example of a receiving procedure may be initiated with an RX_REORD value of X, an RX NEXT value of X+5, and an RX_DELIV X−10.

In some cases, a UE 115-*a* may append RT1 to the timer queue 405 with an RX_REORD X and a duration 410. At time T0, the UE 115-*a* may initiate RT1. The UE 115-*a* may initiate RT1 at the same time as the time stamp of the missing packet (e.g., the packet having sequence number X), or at some point in time thereafter. The UE 115-*a* may initiate other timers for subsequent sequence holes as discussed herein in a similar manner. During duration 410 of RT1, the UE 115-*a* may receive one or more packets in the sequence or retransmissions of packets in the sequence that are missing (e.g., holes in the sequence). In the depicted example, the received packets may have sequence numbers that include X, X+1, X+2, X+3, and X+9. However, the UE 115-*a* may not receive one or more expected packets in a sequence (e.g., may not receive packets having sequence numbers X+4, X+5, X+6, X+7, and X+8) during the duration 410 of RT1, where the sequence number of each missing packet is referred to as being a hole in the sequence. Having received the packet associated with the previous RX_REORD value (e.g., X) during the duration 410 of RT1, the UE 115-*a* remove RT1 from the timer queue 405, and may flush received packets having sequence numbers X, X+1, X+2, and X+3 (e.g., all packets received up to the sequence number associated with RX_REORD=X and any consecutive successfully received packets occurring after RX_REORD=X up to the sequence number associated with RX NEXT, where in this example RX NEXT=X+5) to higher layers.

The UE 115-*a* may also set RX_DELIV to X+4 (e.g., the sequence number of the next missing packet after flushing packet up to sequence number X+3 up to higher layers), RX NEXT to X+10 (e.g., the next expected sequence number after highest sequence number X+9, which was received during duration 410 prior to T1), and RX_REORD to X+10 (e.g., equal to RX NEXT). In some cases, the UE 115-*a* may flush the packets and remove RT1 prior to reaching the full duration 410 (upon receiving one or more consecutive packets including the packet associated with RX_REORD X before RT1 expires). In some other cases, the UE 115-*a* may not remove the timer RT1 and may allow it to continue running for the full duration 410. At T1, the UE 115-*a* may reset the new RX_REORD value at X+10 for a new RT (e.g., RT2), and may append RT2 to the end of the timer queue 405 (e.g., may set a new RT to perform reordering procedures associated with the newly identified holes in the sequence including sequence numbers X+4 through X+8).

The UE 115-*a* may perform reordering procedures during the duration 410 of RT2. In some cases, the duration 410 of RT2 may be the same size as the duration of RT1. At T1 (e.g., at the same time as the time stamp of the missing packet associated with RT2, or at some point thereafter), the UE 115-*a* may initiate RT2, and may receive one or more packets during the duration 410 of RT2. In the depicted example, received packets may have sequence numbers that include X+10, X+11, and X+14. However, the UE 115-*a* may not receive packets having expected sequence numbers X+12 and X+13 during RT2, which may create a hole in the sequence. Having received the packet associated with the previous RX_REORD value (e.g., X+10) during the duration 410 of RT2, the UE 115-*a* may remove RT2 from the timer queue, and may flush received packets having sequence numbers X+10 and X+11 (e.g., all packets received up to the packet having the sequence number associated with RX_REORD and any consecutive packets including the sequence number associated with RX_REORD up to the packet having the sequence number associated with RX NEXT) to higher layers. The UE 115-*a* may also initiate a new timer (RT3) at T2 at the same time as the time stamp of the missing packet associated with RT3, or a some point thereafter. The UE 115-*a* may set, for RT3, RX_DELIV to X+12, RX NEXT to X+15, and RX_REORD to X+15. At T2 and the UE 115-*a* may append RT3 to the end of the timer queue 405 (e.g., may set a new RT to perform reordering procedures associated with the newly identified hole in the sequence including sequence numbers X+12 through X+13).

The UE 115-*a* may perform reordering procedures during RT3. In some cases, the duration 410 of RT3 may be the same size as the duration 410 of RT1 and RT2. At T2, the UE 115-*a* may initiate RT3 (e.g., at the same time as the time stamp of the missing packet associated with RT3, or at some point thereafter), and may receive one or more packets during RT3. The received packets may have sequence numbers that include X+20, X+21, X+22, and X+24. However, the UE 115-*a* may not receive a packet having sequence number X+23 during RT3, which may create a hole in the sequence. Having identified a new hole in the sequence, the UE 115-*a* may initiate a new timer (e.g., RT4). If the UE 115-*a* does not receive the packet associated with the previous RX_REORD value (e.g., X+15) prior to T3, the UE 115-*a* may not remove the previous timer (RT3) at T3 (e.g., because the received packets during the duration 410 for RT3 may not include a packet having a sequence number associated with RX_REORD for RT3).

The UE 115-*a* may also maintain the RX_DELIV of X+12 for RT4, and may set RX NEXT to X+25, and RX_REORD to X+25. Having not received the missing packet of RT3 (e.g., the packet associated with sequence number X+15), the UE 115-*a* may not remove the timer RT3 from the timer queue 405, and may allow it to run until the UE 115-*a* receives the missing packet of RT3 or until RT3 expires (e.g., whichever occurs first). At T3, the UE 115-*a* may reset a new RX_REORD to X+25 for the new RT (e.g., RT4), and may append RT4 to the end of the timer queue 405 (e.g., may set a new RT to perform reordering procedures associated with the newly identified hole in the sequence including sequence number X+23) during the duration 410 of RT3. In some cases, RT3 and RT4 may overlap (e.g., RT3 and RT4 may run simultaneously) until the UE 115-*a* may receive the missing packet of RT3 or until the duration 410 of RT3 expires. For instance, between T3 and T4, RT3 and RT4 may be simultaneously running.

The UE 115-*a* may perform reordering procedures during RT4. The duration 410 of RT4 may be the same size as the duration 410 of RT1, RT2, and RT3. At T3 (e.g., at the same time as the time stamp of the missing packet associated with RT4, or at some point thereafter. The UE 115-*a* may initiate RT4 (e.g., during the duration 410 of RT3), and may receive one or more packets during the duration 410 of RT4. The received packets may have sequence numbers that include X+15, X+16, X+17, and X+18. In some cases, RT3 may still be running (e.g., having not yet received the missing packet of RT3). At T4, the UE 115-*a* may receive or identify a previously received sequence number X+15. Having received the packet associated with the previous RX_REORD value for RT3 (e.g., X+15), during the overlapping portion of RT3 and RT4, the UE 115-*a* may flush received packet X+15, X+16, X+17, and X+18 (e.g., all packets received up to RX-REORD for RT3 and any additional consecutive packets including RX_REORD up to RX NEXT), and may remove RT3 from the timer queue 405. RT4 may continue to run.

During the duration 410 of RT4 (e.g., after removing RT3 from the timer queue 405), the UE 115-*a* may continue to receive or reorder packets (e.g., may receive packets having sequence numbers X+35, X+36, X+37, and X+38). In some examples, RT4 may run until the expiration of RT4. In such examples, despite not having received the RX_REORD value associated with RT4 (e.g., X+25), the UE 115-*a* may flush all received packets up to RX_REORD (e.g., X+21, X+22, and X+24) to higher layers. At T5, the UE 115-*a* may remove RT4 (e.g., which has expired) from the timer queue 405, and may append a new RT (e.g., RT5) with an RX_DELIV of X+26 (e.g., the next undelivered sequence number after RX_REORD of X+25 for RT4), an RX NEXT of X+39, and an RX_REORD of X+39.

By implementing techniques described with reference to FIG. 4, the UE 115-*a* may be able to simultaneously perform multiple reordering procedures, achieve improved effectiveness in reordering, processing, and decoding communications received via multiple links, reduce memory footprint, and the like. For example, the UE 115-*a* may implement multiple reordering timers that each begin at or near a time when a hole in the sequence is identified, and the UE 115-*a* may operate multiple timers simultaneously. The UE 115-*a* may thus attempt to recover one or more missing packets within the time duration of a respective reordering timer that is initiated at or near a time when a hole in the sequence is identified. As such, each reordering timer may expire individually, rather than consecutively, to cause flushing of one or more successfully received packets to one or more higher layers when a respective timer expires to remove those flushed packets from the buffer, rather than waiting to initiate a timer for a next hole in the sequence until after a prior timer expires. This technique may be used, for example, when sequential packets are being sent on different links, where one of the links is experiencing noisy channel conditions and the other is not, to prevent successfully received packets from consuming too much space in the storage buffer while attempting to recover missed packets on the impacted link. In some examples, a small increase in processing complexity based on techniques described with reference to FIG. 4 may be significantly less than the processing resources and memory saved by avoiding the excessive buffering procedures resulting from running only one RT at a time.

Figure 5:
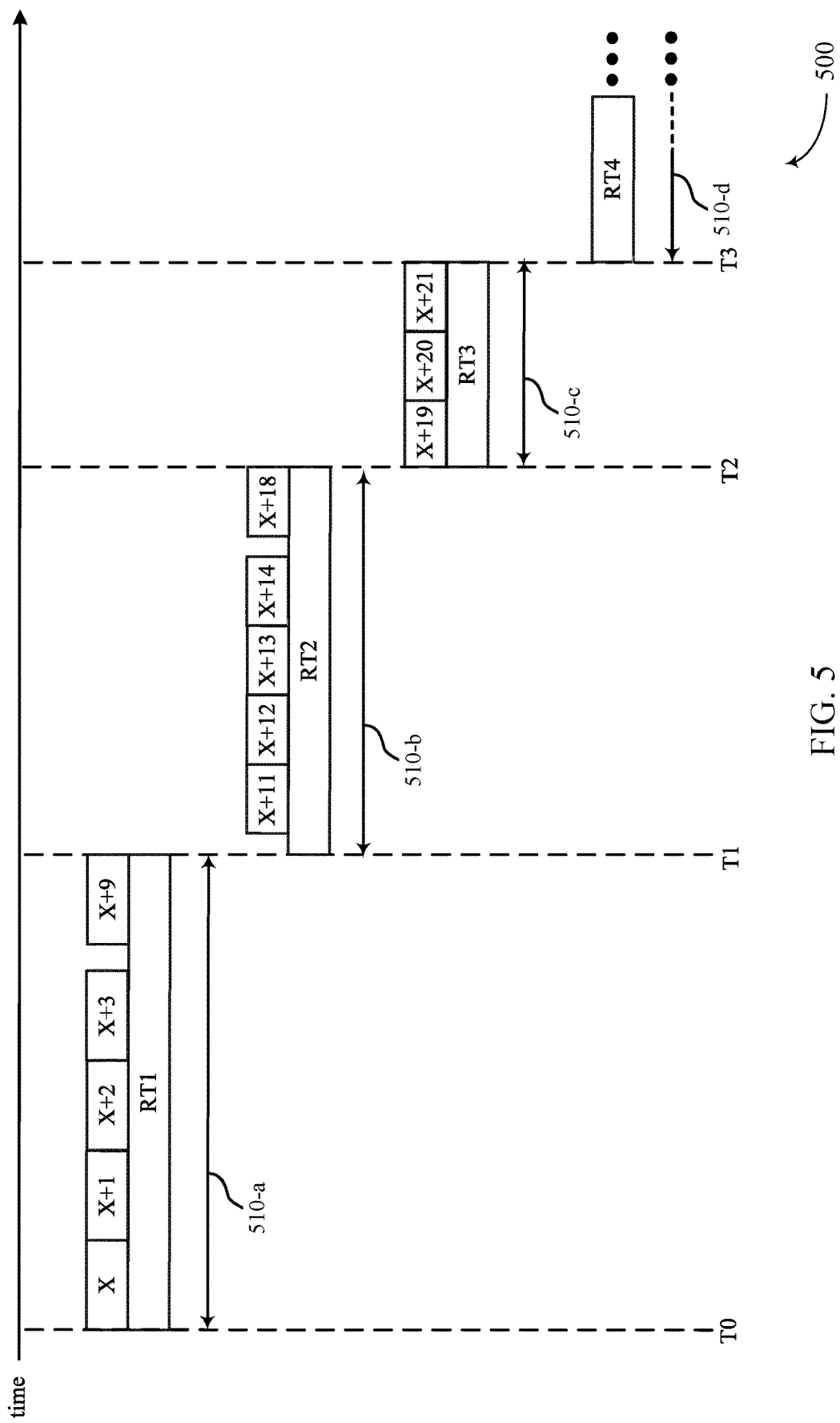
FIG. 5 illustrates an example of a timeline that supports multiple timers for effective reordering in accordance with aspects of the present disclosure.

FIG. 5 illustrates an example of a timeline 500 that supports multiple timers for effective reordering in accordance with aspects of the present disclosure. In some examples, timeline 500 may implement aspects of wireless communications system 100. For example, timeline 400 may be implemented by a UE 115-*a*, a base station 105-*a*, and a base station 105-*b* which may be examples of a UE 115 and a base station 105 as described with reference to FIG. 1.

In some cases, a wireless device (e.g., a UE 115-*a*) may utilize multiple reordering timers (RTs) (e.g., PDCP RTs) one after another (e.g., not simultaneously) having different durations to more efficiently perform reordering operations and reduce memory footprint. In some cases, all of the packets in a set of sequential packets may be sent over a single link (e.g., an NR link). In some cases, some of the packets in a set of sequential packets may be sent over a first link (e.g., an LTE link) and other packets of the packets in the set of sequential packets may be sent over a second link (e.g., an NR link).

The UE 115-*a* may time stamp each packet (e.g., each PDU) received by the PDCP at the UE 115-*a*. The UE 115-*a* (e.g., the PDCP as described with reference to FIG. 3) may maintain separate receive queues for PDUs received on each link (or a single queue for PDUs received on the NR link in the case of a SA NR case). Each queue may be ordered from smallest PDCP count from the head of the queue to largest PDCP count values at the tail of the queue. The UE 115-*a* may maintain a single reordering timer (RT) at a time. When one RT expires, the UE 115-*a* may initiate a new RT. However, instead of setting the duration of the reordering timer to a base station timer-configured timer duration, the UE 115-*a* may adjust (e.g., reduce) the duration of some RTs. The UE 115-*a* may set RX_REORD to the count value associated with the PDU at the head of either receive queue for both links with the earlier or earliest time stamp. For instance, the UE 115-*a* may set RX_REORD to the count value associated with the PDU at the head of the LTE link if the PDU at the head of the LTE queue has an earlier time stamp than the packet at the head of the NR queue (e.g., or vice versa if the PDU at the head of the NR queue has an earlier time stamp). The UE 115-*a* may reduce the configured RT duration based on current time stamps, previous time stamps, or both. For example, the UE 115-*a* may set the duration of a current RT by subtracting, from the configured RT duration, the time stamp of the PDU associated with the new RX_REORD and the time stamp of a PDU associated with a previous RX_REORD. The UE 115-*a* may then set the RX_REORD to the new RX_REORD.

In some cases, an RT timer may run out (e.g., due to memory constraints). In some example, each timer may use less than 10 bytes. In such examples, when an RT runs out, the UE 115-*a* may modify a last timer already start with a new time stamp and a new RX_REORD value.

As illustrated in FIG. 5, for example, a UE 115-*a* may maintain two packet queues (e.g., a PDCP queue for PDUs received on the first link and a PDCP queue for PDUs received on the second link). In some cases, a receiving period may be initiated with an RX_REORD value of X−1, an RX NEXT of X−1, and an RX_DELIV of X−3. At T0, the UE 115-*a* may start a RT (e.g., RT1) with a duration 510-*a*. The UE 115-*a* may start RT1 based at least in part on a first time stamp corresponding to unsuccessful decoding of a first packet in the sequential order (e.g., the UE 115-*a* may start RT1 with an RX_REORD value of X−1, the count value associated with the PDU at the head of the receive queue that has the earlier or earliest time stamp in either queue). Each reordering timer may be initiated at a respective time indicated in a respective time stamp assigned to a particular missed packet, or some time thereafter. The duration 510-*a* may be equal to a time duration configured by the base station (e.g., 100 ms). In some cases, the UE 115-*a* may receive one or more packets at a rate such that the UE 115-*a* may receive one packet per millisecond. In such cases, the UE 115-*a* may receive a packet having packet sequence number X at 1 ms, X+1 at 2 ms, X+2 at 3 ms, X+3 at 4 ms, and X+9 at 5 ms during the duration 510-*a* of RT1. However, the UE 115-*a* may not receive packets having packet sequence numbers X+4, X+5, X+6, X+7, and X+8 during the duration 510-*a*, which may create a hole in the sequence. RT1 may expire at T1, and the UE 115-*a* may flush received packets X, X+1, X+2, and X+3 (e.g., all packets received up to RX_REORD and any consecutive packets including RX_REORD up to RX NEXT) to higher layers. The UE 115-*a* may also set RX_DELIV to X+4 and RX_REORD to X+10. At T1, the UE 115-*a* may initiate a new RT (e.g., RT2 with RX_REORD set to X+10). During the duration of RT2, the UE 115-*a* may perform reordering procedures associated with the newly identified hole in the sequence including sequence numbers X+4 through X+8.

The UE 115-*a* may initiate RT2 with a duration 510-*b*. The UE 115-*a* may start RT2 based at least in part on a first time stamp corresponding to unsuccessful decoding of a second packet in the sequential order (e.g., the UE 115-*a* may start RT2 with an RX_REORD value of X+10, the count value associated with the PDU at the head of the receive queue that has the earlier or earliest time stamp in either queue). In some cases, the duration 510-*b* may be equal to the RT duration configured by the base station 105

(e.g., t_reorder) minus the time stamp of the packet associated with the new RX_REORD value. Thus, the duration of RT2 may be based on the time stamp of the new missing packet. For example, the UE 115-a may receive packet X+9 at 5 ms after the start of the timer RT1, so the time stamp on packet X+9 may be 5 ms in this example. If the RT duration (e.g., the duration 510-a) configured by the base station 105 is 100 ms, the duration 510-b of RT2 may be 95 ms (e.g., 100 ms minus 5 ms). At T1, the UE 115-a may initiate RT2. The UE 115-a may receive one or more packets during the duration 510-b. In the depicted example, the UE 115-a may receive packets having sequence numbers X+11 at 7 ms, X+12 at 8 ms, X+13 at 9 ms, X+14 at 10 ms, and X+18 at 11 ms during RT2. However, the UE 115-a may not receive packets having sequence numbers X+15, X+16, and X+17 during the duration 510-b, which may create a hole in the sequence. RT2 may expire at T2 (e.g., 95 ms after T1).

Upon expiration of RT2, the UE 115-a may flush all received packets up to RX REORDER (e.g., X+10) and may flush all subsequent consecutive received packets (e.g., X+11, X+12, X+13, X+14). The UE 115-a may set RX NEXT to X+19, RX_REORD to X+19, and RX_DELIV to X+15 (e.g., X+14 plus 1). At T2, the UE 115-a may initiate a new RT (e.g., RT3) for the new RX_REORD value of X+19 associated with the new hole in the sequence including sequence numbers X+15 through X+17).

The UE 115-a may initiate RT3 with a duration 510-c. The UE 115-a may start RT3 based at least in part on a first time stamp corresponding to unsuccessful decoding of a third packet in the sequential order (e.g., the UE 115-a may start RT3 with an RX_REORD value of X+19, the count value associated with the PDU at the head of the receive queue that has the earlier or earliest time stamp in either queue). In some cases, the duration 510-c may be equal to the RT duration configured by the base station 105, minus the time stamp of the packet associated with the new RX_REORD value, minus the time stamp of the previous RX_REORD of the just expired timer. For example, the UE 115-a may have received packet X+9 at 5 ms (e.g., time stamp 5 ms) after the start of the timer RT1, and may receive packet X+18 at 11 ms (e.g., time stamp 11 ms), and the RT duration configured by the base station 105 may be 100 ms. Thus, the duration 510-c may be 84 ms (e.g., 100 ms minus 5 ms minus 11 ms).

The UE 115-a may receive one or more packets during duration 510-c. The received packets may have sequence numbers that include X+19, X+20, and X+21. In some cases, the received packet numbers may all be consecutive and may not create a hole in the sequence. After receiving the packet associated with the previous RX_REORD value (e.g., X+19) during the duration 510-c of RT3, RT3 may expire at T3. The UE 115-a may flush received packets X+19, X+20, and X+21 (e.g., all packets received up to RX_REORD and any consecutive packets including RX_REORD up to RX NEXT) to higher layers. In some cases, at T3 the UE 115-a may determine that no sequence holes were identified during duration 510-c of RT3. In such cases, the UE 115-a may set a next RT back to the configured duration 510-a when no holes were identified within a duration of the preceding RT, to prevent the duration of a RT from becoming too short. For example, at T3, the UE 115-a may initiate RT4 with a duration 510-d that is the same size as the duration 510-a for RT1. Or, in some examples, duration 510-d may be different than the duration 510-a.

In some examples, performing techniques described with reference to FIG. 5 may result in reduced complexity, and better reordering, processing, and decoding effectiveness with reduced memory footprint. For example, the UE 115-a may consecutively operate a set of reordering timers where each timer is shorter than a previous timer. Shortening each successive timer may reduce the time between each flushing successfully received packet to one or more higher layers for removing those packets from the buffer. This technique may be used, for example, when sequential packets are being sent on different links, where one of the links is experiencing noisy channel conditions and the other is not. These techniques may regularly flush successfully packets received packets to one or more higher layers to clear those packets from a buffer of a UE, and thereby promote efficient use of buffer memory, improved throughput, decreased delays, and improved user experience.

In some cases, a UE 115-a may enter a safe mode. For instance, the UE 115-a may have a small amount of available memory due to excessive buffering. The UE 115-a may support substantial reordering at both RLC layers and PDCP layers. In such cases, the UE 115-a may flush packet sequence numbers on both RLC and PDCP layers on a best-effort basis (e.g., as in Unacknowledged Mode (UM)). For example, the UE 115-a may be able to deliver packet sequence number 2 at a time T+101 ms, packet sequence number 4 at time T+102 ms, and packet sequence number 6 at T+103 ms, and so on. This may result in increased effectiveness and may reduce device cost, as well as enhance the round-trip time (RTT) of TCP/IP traffic, among other benefits. The UE 115-a may enter such a safe mode based on available memory when performing techniques described with reference to FIG. 4, or techniques described with reference to FIG. 5.

Figure 6:
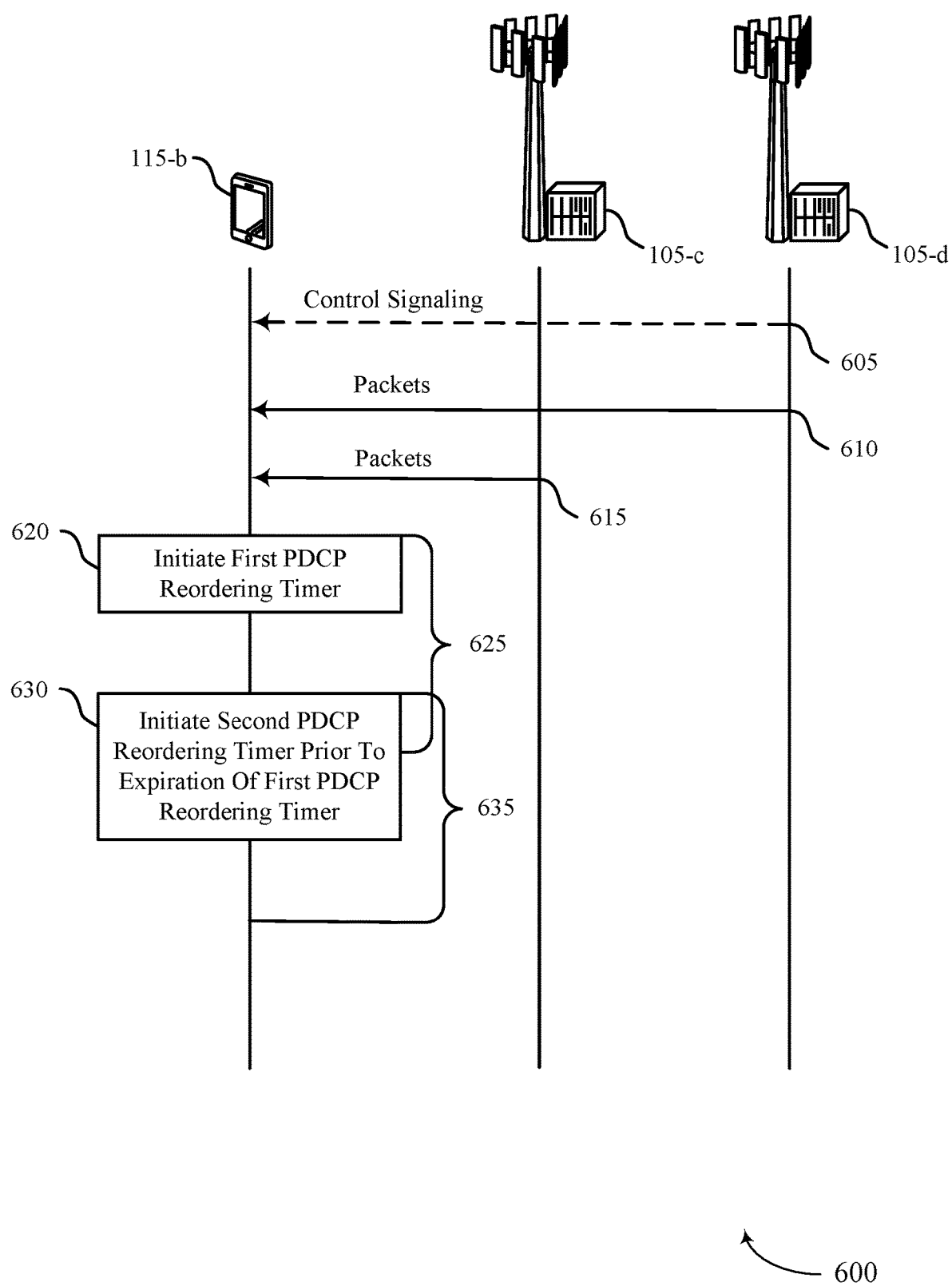
FIG. 6 illustrates an example of a process flow that supports multiple timers for effective reordering in accordance with aspects of the present disclosure.

FIG. 6 illustrates an example of a process flow 600 that supports multiple timers for effective reordering in accordance with aspects of the present disclosure. The process flow 600 may implement aspects of wireless communications systems 100, or may be implemented by aspects of the wireless communications system 100. For example, a UE 115-b, a base station 105-c and a base station 105-d may be examples of a UE 115 and a base station 105, as described with reference to FIGS. 1-5. In the following description of the process flow 600, the operations between the UE 115-b, the base station 105-c, and the base station 105-d may be transmitted in a different order than the example order shown, or the operations performed by the UE 115-b, the base station 105-c, and the base station 105-d may be performed in different orders or at different times. Some operations may also be omitted from the process flow 600, and other operations may be added to the process flow 600. Although FIG. 5 illustrates and describes a case where the UE 115-b communicate with one or more base stations 105 via multiple links, techniques described with reference to FIG. 6 may also be applied to cases where the UE 115-b communicate with one or more base stations 105 via a single link (e.g., an NR link). In such examples, the UE 115-b may utilize multiple reordering timers (e.g., simultaneously) as described with reference to FIG. 6 if one or more packets are not received in sequential order. For instance, on a single link (e.g., an NR link), some PDCP sequence numbers may be missing due to decoding failure of one HARQ while another HARQ passes, in which case a reordering timer may start, as described herein.

At 605, a UE 115-b may receive control signaling indicating a time duration of a first reordering timer (e.g., a PDCP reordering timer) from a base station 105-c or a base station 105-d, or both. In some cases, the UE 115-b may not receive control signaling from a base station 105 (e.g., a duration for reordering timers may be preconfigured, included in one or more standards document, or the like). At 610, the UE 115-*b* may receive, from a base station 105-*d*, a first subset of a set of sequential packets (e.g., PDUs). In some cases, the base station 105-*d* may transmit the first subset of the set of sequential packets over a first link (e.g., an LTE link). At 615, the UE 115-*b* may receive, from a base station 105-*c*, a second subset of the set of sequential packets (e.g., PDUs), where the second subset of packets are different form the first subset. In some cases, the base station 105-*c* may transmit the second subset of the set of sequential packets over a second link (e.g., an NR link). In some cases, each packet may be assigned a sequence number such UE 115-*b* may order packets upon receipt regardless of which link is used to transmit the packet. In some examples, having received the packets at 610 and the packets at 615, the UE 115-*a* may store the packets received at 610 in a first packet queue (e.g., a PDCP queue) and may store the packets received at 615 in a second packet queue (e.g., PDCP queue).

At 620, the UE 115-*b* may initiate a first reordering timer that is initiated for a first time stamp corresponding to unsuccessful decoding of a first packet in the sequential order. For example, the UE 115-*b* may identify a hole in the sequence caused by the missed first packet, and may initiate the reordering timer specifying a time period in which the UE 115-*b* may monitor for retransmission of the missed packet. In some cases, the first reordering timer may have a duration 625.

At 630, prior to the expiration of the first reordering timer (e.g., during the duration 625), the UE 115-*b* may determine that a second packet in the sequential order was not successfully decoded and initiate a second reordering timer based on a second time stamp assigned to the second packet. For example, the UE 115-*b* may identify a second hole in the sequence caused by the missed second packet. In some cases, the second reordering timer may have a duration 635. In some cases, the first reordering timer and the second reordering timer may overlap (e.g., run simultaneously).

In some examples, the UE 115-*b* may store, in a buffer, one or more received packets. The UE 115-*b* may store received packets that have a higher value than the identified missing packet in the buffer. In some examples, the UE 115-*b* may buffer packets in two separate PDCP queues for the two different links.

In some examples, the UE 115-*b* may flush one or more packets to upper layers for processing or decoding upon receiving the missing packets, or upon expiration of a reordering timer. For example (e.g., upon receiving the first packet or upon expiration of the first reordering timer at the end of duration 625), the UE 115-*b* may remove from the buffer one or more packets having sequence numbers lower than (e.g., up to) the sequence number of the first packet, and any packets having sequence numbers in sequential order higher than the sequence number of the first packet (e.g., including the first packet), but lower than the sequence number of the second packet. In some examples, (e.g., upon receiving the second packet or upon expiration of duration 635), the UE 115-*b* may remove from the buffer packets that that have lower sequence numbers than the sequence number of the second packet (e.g., but higher than the sequence number of the first packet number), and any packets having consecutive sequence numbers higher than the sequence number of the second packet (e.g., including the second packet).

The UE 115-*b* may also subsequently initiate one or more additional reordering timers for additionally identified missing packets. For example, the UE 115-*b* may be unable to successfully decode a third packet in the sequence, assign a time stamp to the third packet, and initiate a third reordering timer (e.g., during duration 625, during duration 635, both, or after duration 635) that starts relative to the time stamp assigned to the third packet.

The UE 115-*b* may append or remove timers from a queue of timers. For example, upon initiating the first reordering timer at 620, the UE 115-*b* may add the first reordering timer to a reordering timer queue. Upon receiving the first packet, or upon expiration of duration 625, the UE 115-*b* may remove the first reordering timer from the reordering timer queue.

Figure 7:
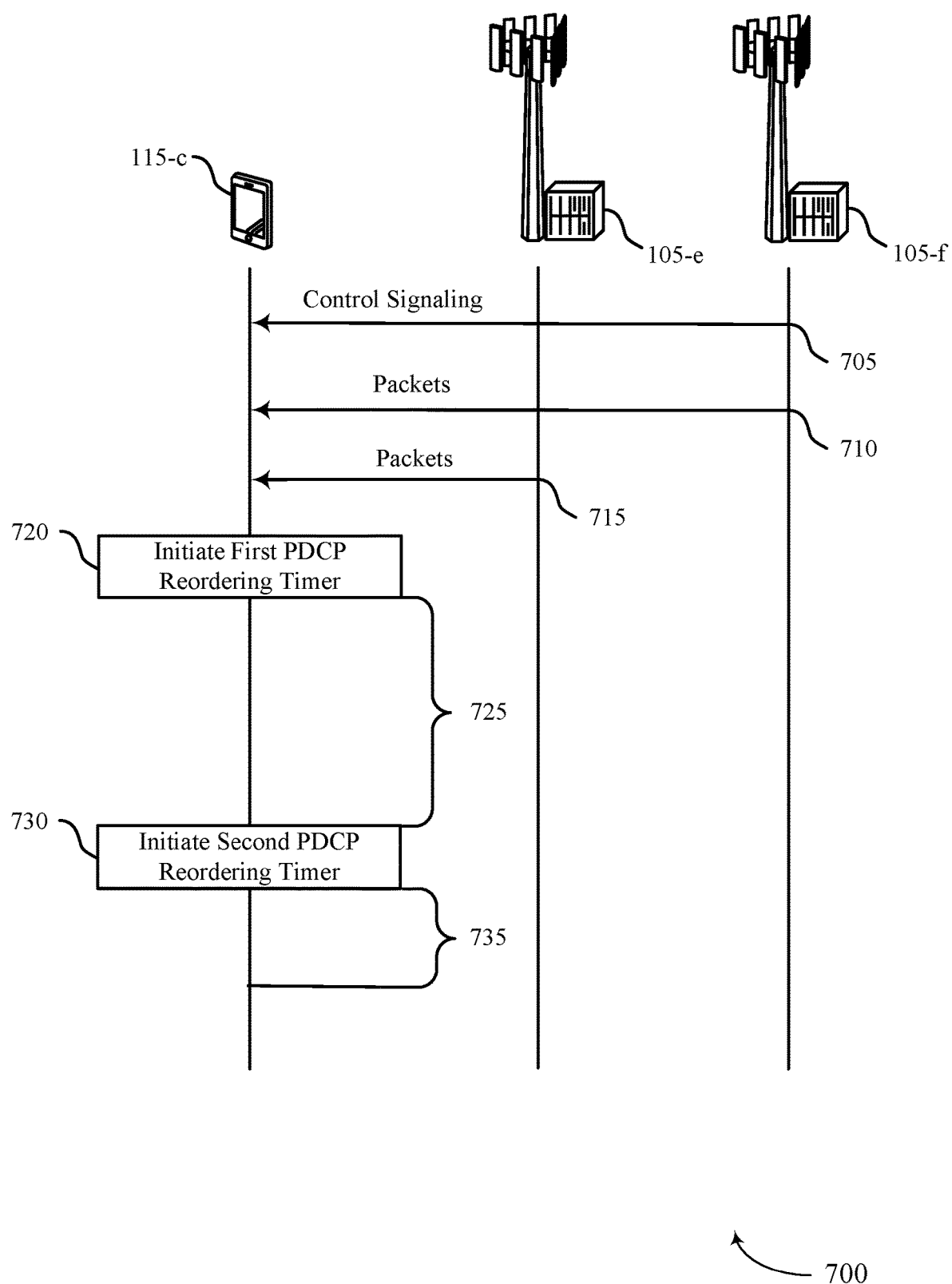
FIG. 7 illustrates an example of a process flow that supports multiple timers for effective reordering in accordance with aspects of the present disclosure.

FIG. 7 illustrates an example of a process flow 700 that supports multiple timers for effective reordering in accordance with aspects of the present disclosure. The process flow 700 may implement aspects of wireless communications systems 100, or may be implemented by aspects of the wireless communications system 100. For example, a UE 115-*c*, a base station 105-*e* and a base station 105-*f* may be examples of a UE 115 and a base station 105, as described with reference to FIG. 1. In the following description of the process flow 700, the operations between the UE 115 *c*, the base station 105-*e*, and the base station 105-*f* may be transmitted in a different order than the example order shown, or the operations performed by the UE 115 *c*, the base station 105-*e*, and the base station 105-*f* may be performed in different orders or at different times. Some operations may also be omitted from the process flow 700, and other operations may be added to the process flow 700. Although FIG. 7 illustrates and describes a case where the UE 115-*c* communicate with one or more base stations 105 via multiple links, techniques described with reference to FIG. 7 may also be applied to cases where the UE 115-*c* communicate with one or more base stations 105 via a single link (e.g., an NR link). In such examples, the UE 115-*c* may utilize multiple reordering timers (e.g., one after another having progressively shorter durations) as described with reference to FIG. 7 if one or more packets are not received in sequential order. For instance, on a single link (e.g., an NR link), some PDCP sequence numbers may be missing due to decoding failure of one HARQ while another HARQ passes, in which case a reordering timer (e.g., a PDCP reordering timer) may start, as described herein.

At 705, a UE 115-*c* may receive control signaling indicating a time duration of a first reordering from a base station 105-*e* or a base station 105-*f*, or both. At 710, the UE 115-*c* may receive, from a base station 105-*f*, a first subset of a set of sequential packets (e.g., PDUs). In some cases, the base station 105-*f* may transmit the first subset of the set of packets over a first link (e.g., an LTE link). At 715, the UE 115-*c* may receive, from a base station 105-*e*, a second subset of the set of packets (e.g., PDUs), where the second subset may differ from the first subset. In some cases, the base station 105-*e* may transmit the second subset of the set of packets over a second link (e.g., an NR link). In some cases, each packet may be assigned a sequence number such that the UE 115-*c* may order the packets upon receipt regardless of which link is used to transmit the packet. In some cases, each packet may be time stamped with the time that the UE 115-*c* may receive the packet.

At 720, the UE 115-*c* may be unable to successfully decode a first packet in the sequential order, assign a time stamp to the first packet, and may initiate a first reordering timer that begins at a time corresponding to the time stamp. For example, the UE 115-*c* may identify a hole in the sequence corresponding to a sequence number associated with the first packet. The UE 115-*c* may initiate the reordering timer specifying a time period in which the UE 115-*c* may monitor for retransmissions of the missing first packet and reorder received packets for flushing to upper layers. In some cases, the first reordering timer may have a duration 725. Duration 725 may be equal to the duration indicated at 705.

At 730, subsequent to the expiration of the first reordering timer (after duration 725), the UE 115-*c* may initiate a second reordering timer based on a second time stamp corresponding to unsuccessful decoding of a second packet in the sequential order. In some cases, the second reordering timer may have a shorter duration than the first reordering timer. For example, the second reordering timer may have a duration 735 which may be shorter than the duration 725 of the first reordering timer. In some cases, the UE 115-*c* may only maintain one reordering timer at any given time. Thus, the UE 115-*c* may implement multiple reordering timers one after another (e.g., not simultaneously). In some examples, the UE may determine the duration of each reordering timer by subtracting the time stamp of the current missing packet (e.g., the second packet) and the time stamp of the previous missing packet (e.g., the first missing packet), from the duration of the timer indicated in the control signaling at 705.

In some examples, the UE 115-*c* may store, in a buffer, one or more received packets. The UE 115-*c* may store received packets that have a higher value than the identified missing packet in the buffer. In some examples, the UE 115-*c* may buffer packets in two separate PDCP queues for the two different links.

In some examples, the UE 115-*c* may flush one or more packets to upper layers for processing or decoding upon expiration of a reordering timer. For example, at the end of duration 725, the UE 115-*c* may remove from the buffer one or more packets having sequence numbers lower than (e.g., up to) the sequence number of the first packet, and any packets having sequence numbers in sequential order higher than the first packet (e.g., including the first packet), but lower than the second packet. In some examples, upon expiration of duration 735, the UE 115-*c* may remove from the buffer packets that that have lower sequence numbers than the sequence number of the second packet (e.g., but higher than the sequence number of the first packet number), and any packets having consecutive sequence numbers higher than the sequence number of the second packet (e.g., including the second packet).

The UE 115-*c* may also initiate one or more additional reordering timers for additionally identified missing packets. For example, upon identifying a third time stamp corresponding to unsuccessful decoding of a third packet, the UE 115-*c* may initiate a third reordering timer. In some examples, if no additional holes are identified for a sequence while a particular reorder timer is running, the UE 115-*c* may reset the timer duration back to an initially configured value for the timer (e.g., set the timer duration back to 100 ms).

The UE 115-*b* may modify a currently running reordering timer (e.g., the second reordering timer) if memory runs out (e.g., a memory threshold is satisfied). In such examples, the UE 115-*b* may initiate the modified reordering timer based on a third timestamp associated with a third missing packet.

Figure 8:
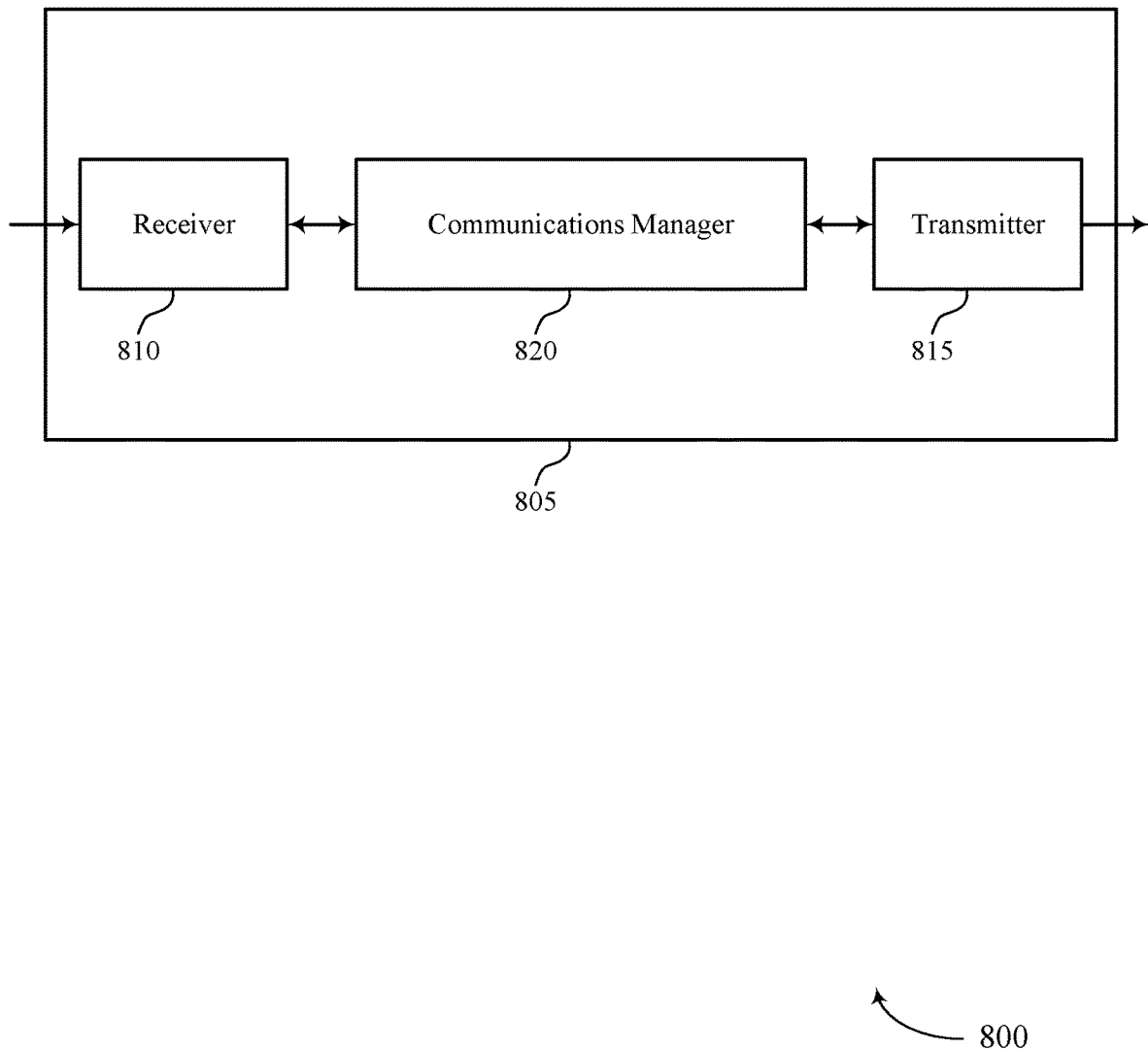
FIGS. 8 and 9 show block diagrams of devices that support multiple timers for effective reordering in accordance with aspects of the present disclosure.

FIG. 8 shows a block diagram 800 of a device 805 that supports multiple timers for effective reordering in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiple timers for effective reordering). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiple timers for effective reordering). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multiple timers for effective reordering as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a wireless device in accordance with examples as disclosed herein. For example, the communications manager 820 may be configured as or otherwise support a means for receiving a set of multiple packets having a sequential order. The communications manager 820 may be configured as or otherwise support a means for initiating a first PDCP reordering timer based on a first time stamp corresponding to unsuccessful decoding of a first packet in the sequential order. The communications manager 820 may be configured as or otherwise support a means for initiating, prior to expiration of the first PDCP reordering timer, a second PDCP reordering timer based on a second time stamp corresponding to unsuccessful decoding of a second packet in the sequential order.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing memory footprint and increasing overall signal reliability by utilizing multiple PDCP reordering timers to more efficiently perform reordering operations. Further, appending and removing timers for multiple identified packet sequence numbers, or adjusting the duration of one or more timers, or both, may result in a more efficient use of memory, improved data throughput, decreased delays, and improved user experience.

Figure 9:
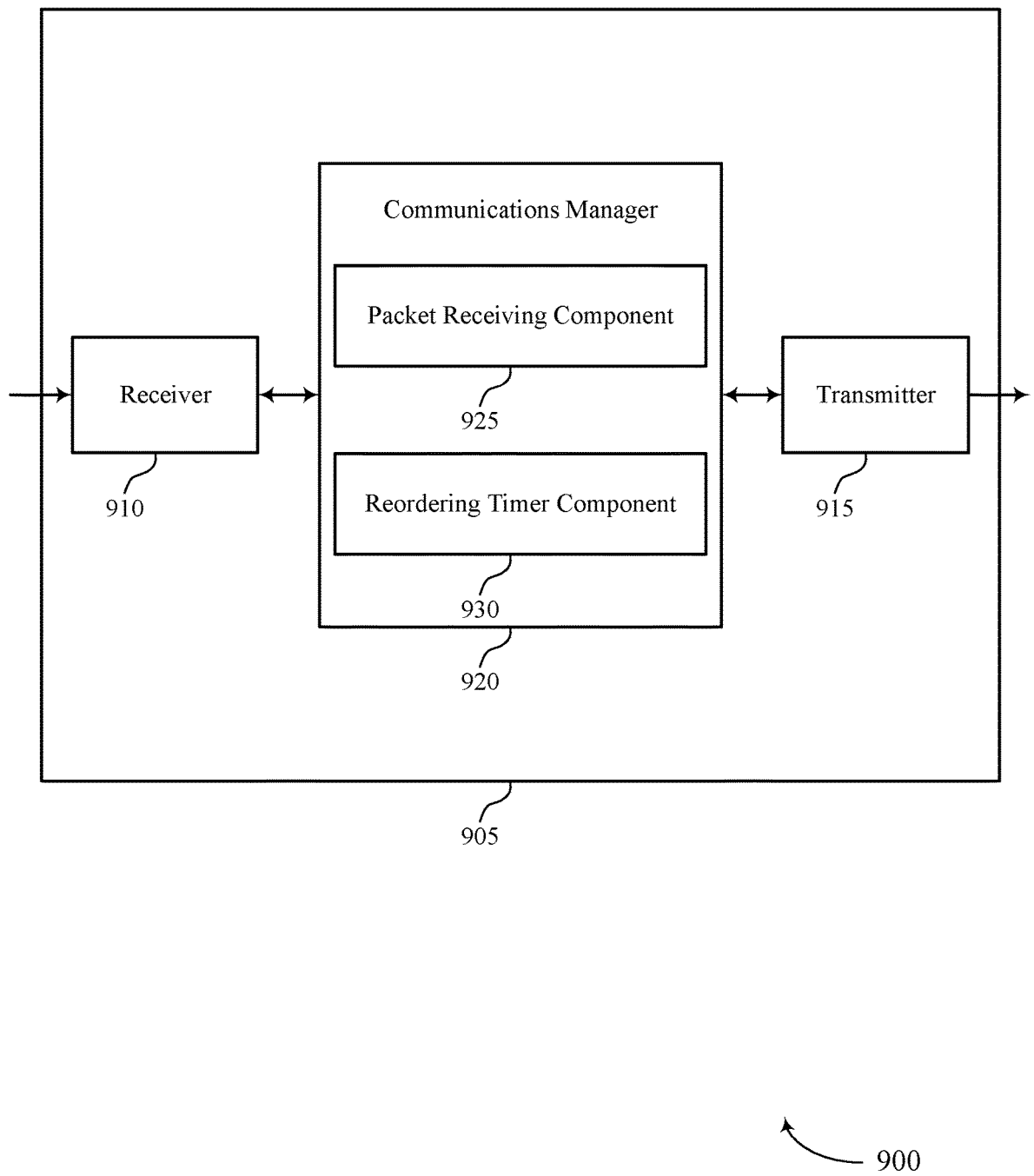

FIG. 9 shows a block diagram 900 of a device 905 that supports multiple timers for effective reordering in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multiple timers for effective reordering). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiple timers for effective reordering). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multiple timers for effective reordering as described herein. For example, the communications manager 920 may include a packet receiving component 925 a PDCP reordering timer component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a wireless device in accordance with examples as disclosed herein. The packet receiving component 925 may be configured as or otherwise support a means for receiving a set of multiple packets having a sequential order. The PDCP reordering timer component 930 may be configured as or otherwise support a means for initiating a first PDCP reordering timer based on a first time stamp corresponding to unsuccessful decoding of a first packet in the sequential order. The PDCP reordering timer component 930 may be configured as or otherwise support a means for initiating, prior to expiration of the first PDCP reordering timer, a second PDCP reordering timer based on a second time stamp corresponding to unsuccessful decoding of a second packet in the sequential order.

Figure 10:
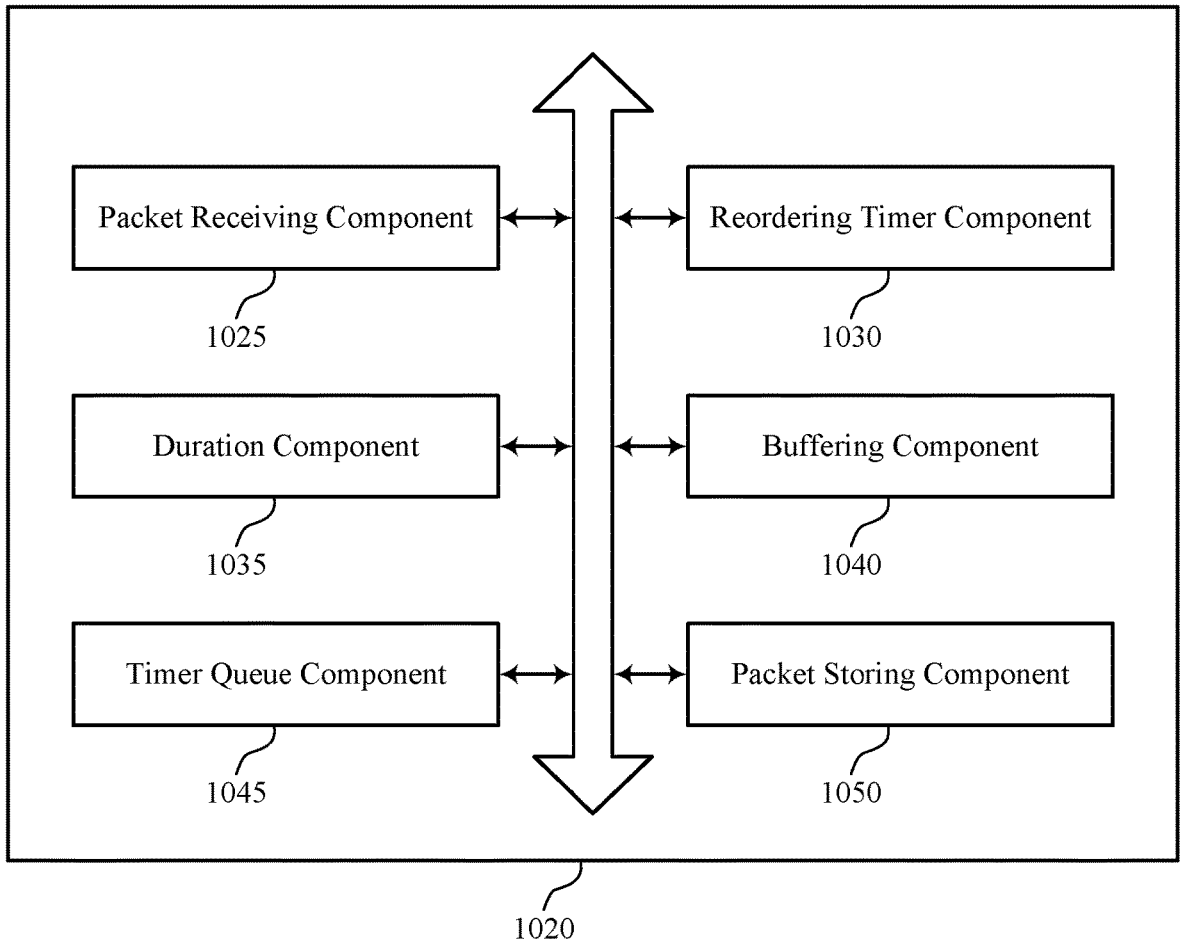
FIG. 10 shows a block diagram of a communications manager that supports multiple timers for effective reordering in accordance with aspects of the present disclosure.

FIG. 10 shows a block diagram 1000 of a communications manager 1020 that supports multiple timers for effective reordering in accordance with aspects of the present disclosure. The communications manager 1020 may be an example of aspects of a communications manager 820, a communications manager 920, or both, as described herein. The communications manager 1020, or various components thereof, may be an example of means for performing various aspects of multiple timers for effective reordering as described herein. For example, the communications manager 1020 may include a packet receiving component 1025, a PDCP reordering timer component 1030, a duration component 1035, a buffering component 1040, a timer queue component 1045, a packet storing component 1050, or any combination thereof. Each of these components may communicate, directly or indirectly, with one another (e.g., via one or more buses).

The communications manager 1020 may support wireless communications at a wireless device in accordance with examples as disclosed herein. The packet receiving component 1025 may be configured as or otherwise support a means for receiving a set of multiple packets having a sequential order. The PDCP reordering timer component 1030 may be configured as or otherwise support a means for initiating a first PDCP reordering timer based on a first time stamp corresponding to unsuccessful decoding of a first packet in the sequential order. In some examples, the PDCP reordering timer component 1030 may be configured as or otherwise support a means for initiating, prior to expiration of the first PDCP reordering timer, a second PDCP reordering timer based on a second time stamp corresponding to unsuccessful decoding of a second packet in the sequential order.

In some examples, the duration component 1035 may be configured as or otherwise support a means for receiving control signaling indicating a duration of the first PDCP reordering timer.

In some examples, to support receiving the set of multiple packets, the packet receiving component 1025 may be configured as or otherwise support a means for receiving a first subset of the set of multiple packets via a first wireless communications link. In some examples, to support receiving the set of multiple packets, the packet receiving component 1025 may be configured as or otherwise support a means for receiving a second subset of the set of multiple packets via the first wireless communications link or a second wireless communications link.

In some examples, the packet storing component 1050 may be configured as or otherwise support a means for storing one or more packets of the first subset of the set of multiple packets in a first queue. In some examples, the packet storing component 1050 may be configured as or otherwise support a means for storing one or more packets of the second subset of the set of multiple packets in a second queue.

In some examples, the one or more packets of the first subset of the set of multiple packets, the one or more packets of the second subset of the set of multiple packets, or both, have sequence numbers higher than the first packet.

In some examples, the first wireless communications link is a first radio bearer of a split radio bearer that operates in accordance with a first radio access technology, and the second wireless communications link is a second radio bearer of the split radio bearer that operates in accordance with the first radio access technology or a second radio access technology.

In some examples, the buffering component 1040 may be configured as or otherwise support a means for removing, from a buffer of the wireless device upon expiration of the first PDCP reordering timer, a first subset of packets having a sequence number in the sequential order that is lower than the first packet.

In some examples, the buffering component 1040 may be configured as or otherwise support a means for removing, from the buffer of the wireless device upon expiration of the first PDCP reordering timer, a second subset of packets having consecutive sequence numbers in the sequential order higher than the first packet and having sequence numbers in the sequential order lower than the second packet.

In some examples, the buffering component 1040 may be configured as or otherwise support a means for removing, from a buffer of the wireless device upon expiration of the second PDCP reordering timer, a first subset of packets having a sequence number in the sequential order higher than the first packet and lower than the second packet.

In some examples, the buffering component 1040 may be configured as or otherwise support a means for removing, from the buffer of the wireless device upon expiration of the second PDCP reordering timer, a second subset of packets having consecutive sequence numbers higher than the second packet.

In some examples, the PDCP reordering timer component 1030 may be configured as or otherwise support a means for initiating, prior to expiration of the first PDCP reordering timer, the second PDCP reordering timer, or both, a third PDCP reordering timer based on a third time stamp corresponding to unsuccessful decoding of a third packet.

In some examples, the timer queue component 1045 may be configured as or otherwise support a means for receiving the first packet during a duration of the first PDCP reordering timer. In some examples, the timer queue component 1045 may be configured as or otherwise support a means for removing the first PDCP reordering timer from a queue of PDCP reordering timers including the first PDCP reordering timer and the second PDCP reordering timer.

Figure 11:
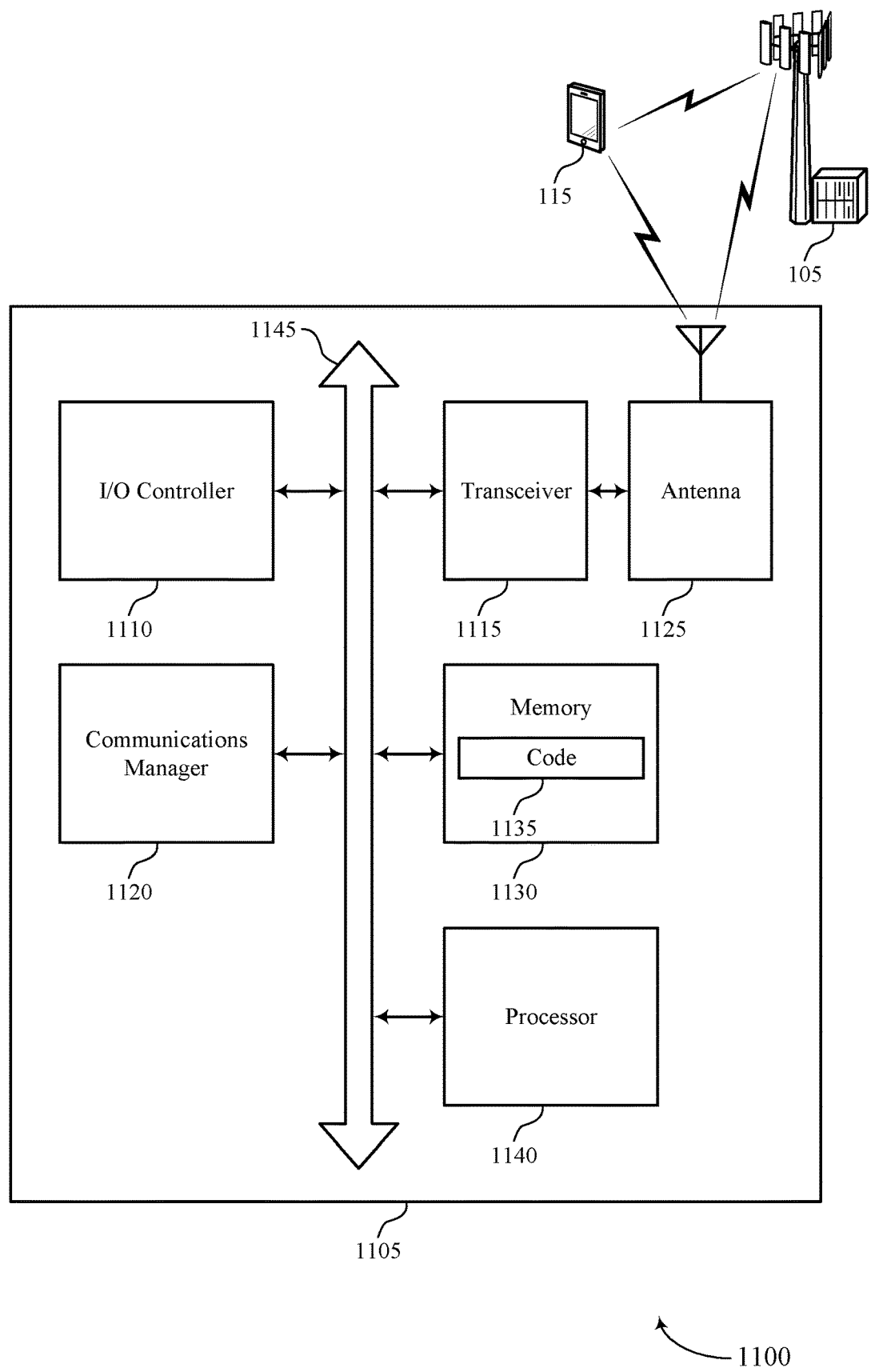
FIG. 11 shows a diagram of a system including a device that supports multiple timers for effective reordering in accordance with aspects of the present disclosure.

FIG. 11 shows a diagram of a system 1100 including a device 1105 that supports multiple timers for effective reordering in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiple timers for effective reordering). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a wireless device in accordance with examples as disclosed herein. For example, the communications manager 1120 may be configured as or otherwise support a means for receiving a set of multiple packets having a sequential order. The communications manager 1120 may be configured as or otherwise support a means for initiating a first PDCP reordering timer based on a first time stamp corresponding to unsuccessful decoding of a first packet in the sequential order. The communications manager 1120 may be configured as or otherwise support a means for initiating, prior to expiration of the first PDCP reordering timer, a second PDCP reordering timer based on a second time stamp corresponding to unsuccessful decoding of a second packet in the sequential order.

By including or configuring the communications manager 1120 in accordance with examples as described herein, the device 1105 may support techniques for reducing memory footprint and increasing overall signal reliability by utilizing multiple reordering PDCP timers to more efficiently perform reordering operations. Further, appending and removing timers for multiple identified packet sequence numbers, or adjusting the duration of one or more timers, or both, may result in a more efficient use of memory, improved data throughput, decreased delays, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multiple timers for effective reordering as described herein, or the processor 1140 and the memory 1130 may be otherwise configured to perform or support such operations.

Figure 12:
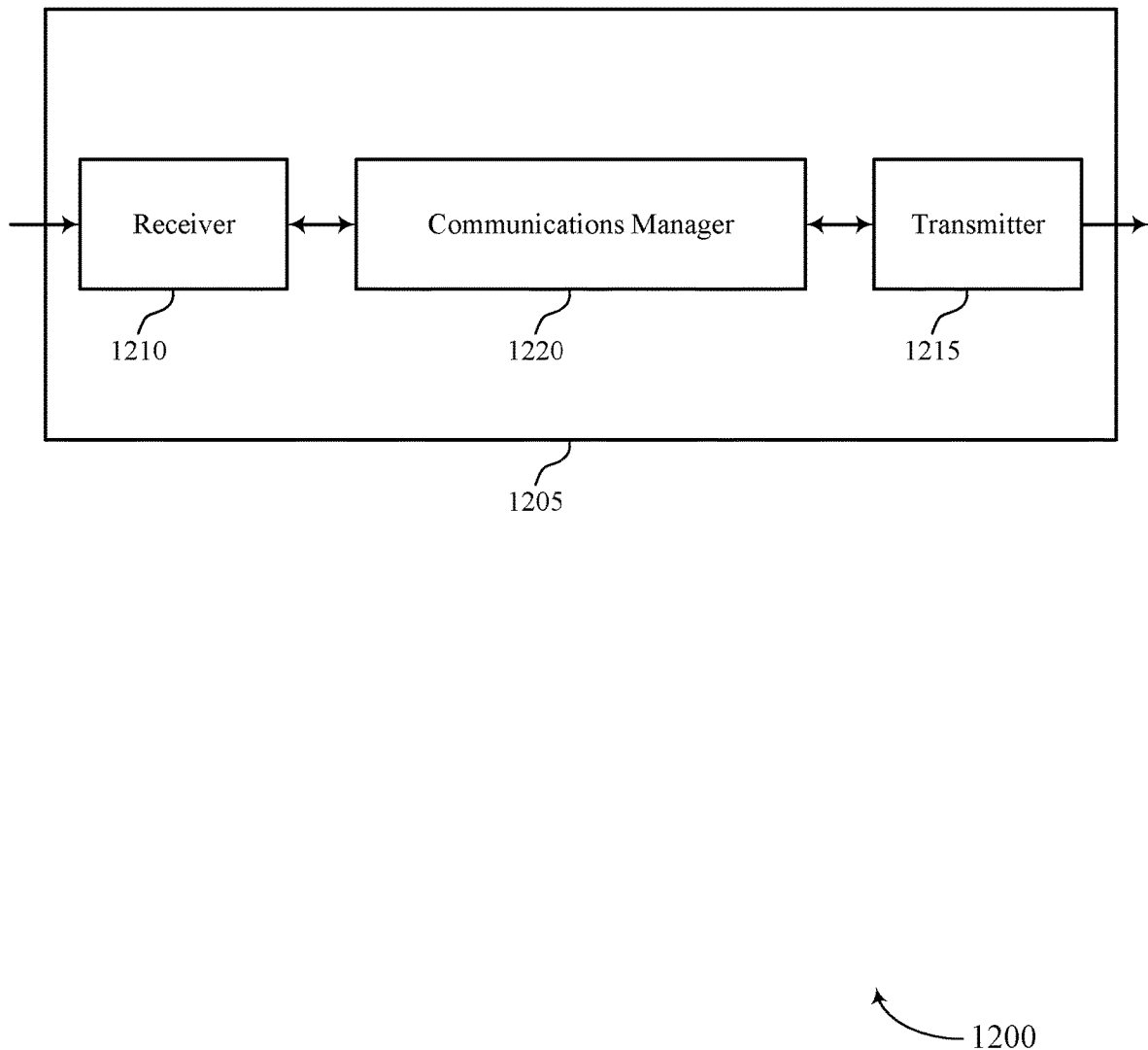
FIGS. 12 and 13 show block diagrams of devices that support multiple timers for effective reordering in accordance with aspects of the present disclosure.

FIG. 12 shows a block diagram 1200 of a device 1205 that supports multiple timers for effective reordering in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multiple timers for effective reordering). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multiple timers for effective reordering). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of multiple timers for effective reordering as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a wireless device in accordance with examples as disclosed herein. For example, the communications manager 1220 may be configured as or otherwise support a means for receiving control signaling indicating a time duration of a first PDCP reordering timer. The communications manager 1220 may be configured as or otherwise support a means for receiving a set of multiple packets having a sequential order. The communications manager 1220 may be configured as or otherwise support a means for initiating a first PDCP reordering timer based on a first time stamp corresponding to unsuccessful decoding of a first packet in the sequential order. The communications manager 1220 may be configured as or otherwise support a means for initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reducing memory footprint and increasing overall signal reliability by utilizing multiple PDCP reordering timers to more efficiently perform reordering operations. Further, appending and removing timers for multiple identified packet sequence numbers, or adjusting the duration of one or more timers, or both, may result in a more efficient use of memory, improved data throughput, decreased delays, and improved user experience.

Figure 13:
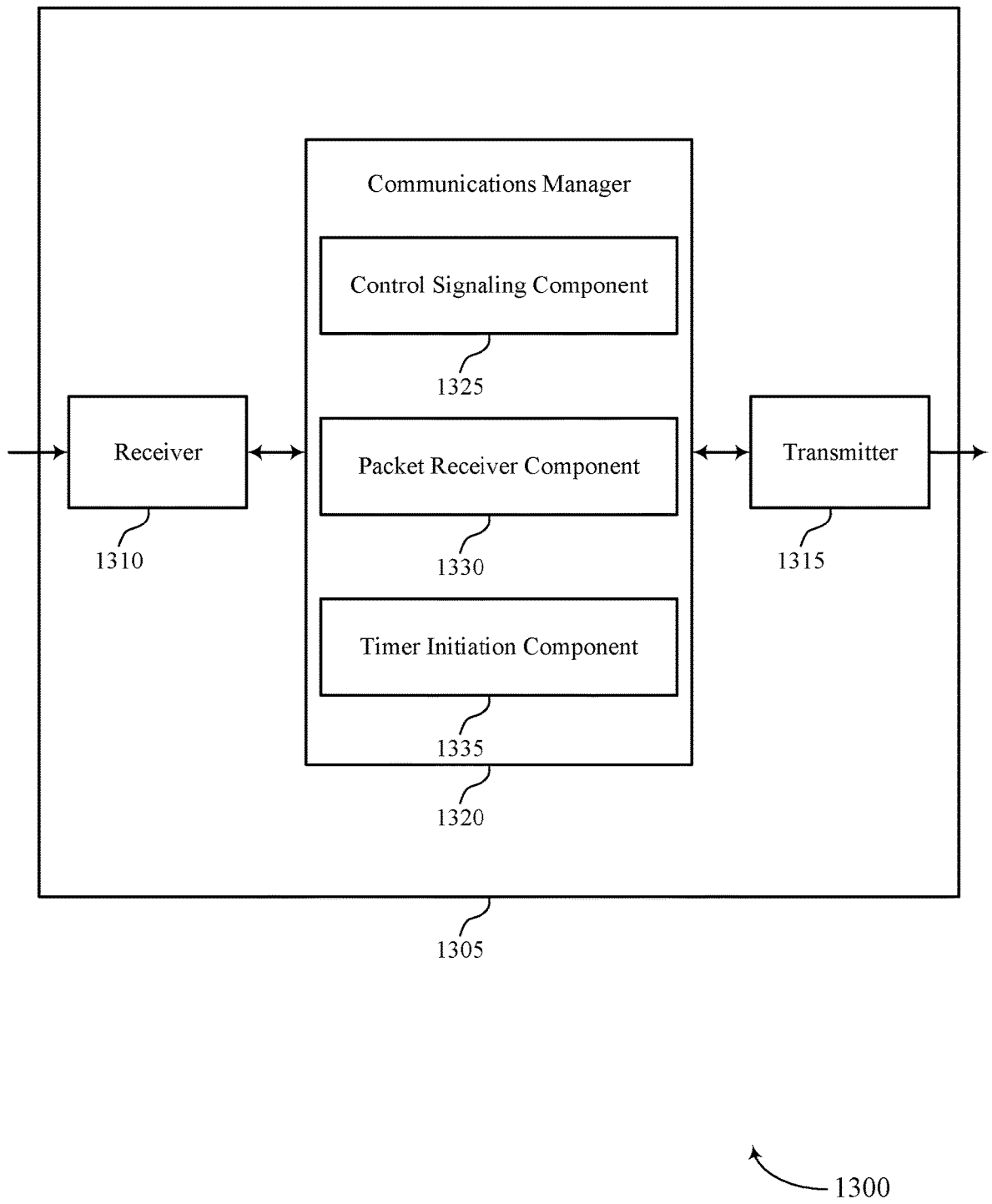

FIG. 13 shows a block diagram 1300 of a device 1305 that supports multiple timers for effective reordering in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to multiple timers for effective reordering). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to multiple timers for effective reordering). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of multiple timers for effective reordering as described herein. For example, the communications manager 1320 may include a control signaling component 1325, a packet receiver component 1330, a timer initiation component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a wireless device in accordance with examples as disclosed herein. The control signaling component 1325 may be configured as or otherwise support a means for receiving control signaling indicating a time duration of a first PDCP reordering timer. The packet receiver component 1330 may be configured as or otherwise support a means for receiving a set of multiple packets having a sequential order. The timer initiation component 1335 may be configured as or otherwise support a means for initiating a first PDCP reordering timer based on a first time stamp corresponding to unsuccessful decoding of a first packet in the sequential order. The timer initiation component 1335 may be configured as or otherwise support a means for initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

Figure 14:
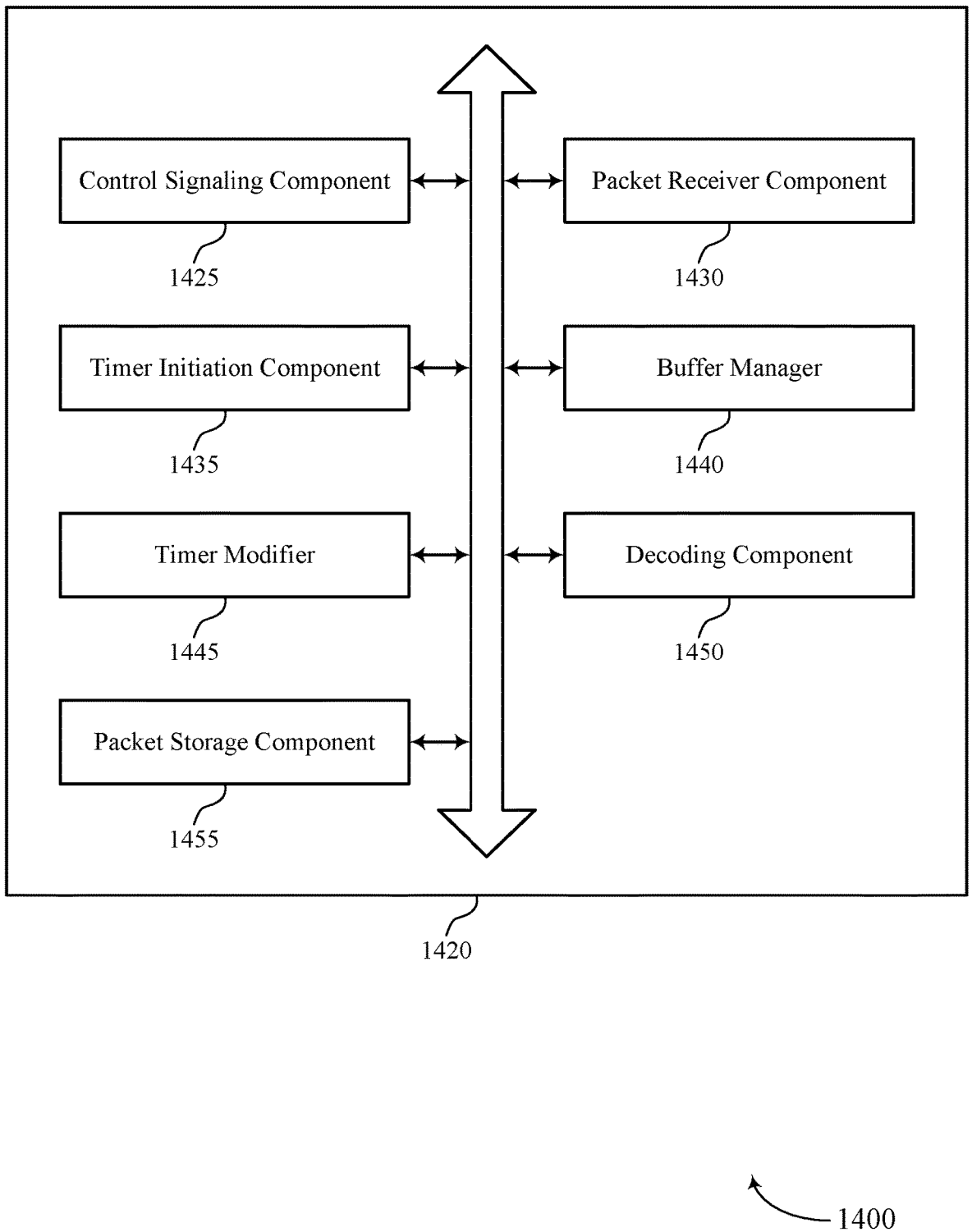
FIG. 14 shows a block diagram of a communications manager that supports multiple timers for effective reordering in accordance with aspects of the present disclosure.

FIG. 14 shows a block diagram 1400 of a communications manager 1420 that supports multiple timers for effective reordering in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of multiple timers for effective reordering as described herein. For example, the communications manager 1420 may include a control signaling component 1425, a packet receiver component 1430, a timer initiation component 1435, a buffer manager 1440, a timer modifier 1445, a decoding component 1450, a packet storage component 1455, or any combination thereof. Each of these components may communicate, directly or indirectly, with one another (e.g., via one or more buses).

The communications manager 1420 may support wireless communications at a wireless device in accordance with examples as disclosed herein. The control signaling component 1425 may be configured as or otherwise support a means for receiving control signaling indicating a time duration of a first PDCP reordering timer. The packet receiver component 1430 may be configured as or otherwise support a means for receiving a set of multiple packets having a sequential order. The timer initiation component 1435 may be configured as or otherwise support a means for initiating a first PDCP reordering timer based on a first time stamp corresponding to unsuccessful decoding of a first packet in the sequential order. In some examples, the timer initiation component 1435 may be configured as or otherwise support a means for initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

In some examples, to support receiving the set of multiple packets, the packet receiver component 1430 may be configured as or otherwise support a means for receiving a first subset of the set of multiple packets via a first wireless communications link. In some examples, to support receiving the set of multiple packets, the packet receiver component 1430 may be configured as or otherwise support a means for receiving a second subset of the set of multiple packets via the first wireless communications link or a second wireless communications link.

In some examples, the packet storage component 1455 may be configured as or otherwise support a means for storing one or more packets of the first subset of the set of multiple packets in a first queue. In some examples, the packet storage component 1455 may be configured as or otherwise support a means for storing one or more packets of the second subset of the set of multiple packets in a second queue.

In some examples, the one or more packets of the first subset of the set of multiple packets, the one or more packets of the second subset of the set of multiple packets, or both, have sequence numbers higher than the first packet.

In some examples, the first wireless communications link is a first radio bearer of a split radio bearer that operates in accordance with a first radio access technology, and the second wireless communications link is a second radio bearer of the split radio bearer that operates in accordance with the first radio access technology or a second radio access technology.

In some examples, the buffer manager 1440 may be configured as or otherwise support a means for removing, from a buffer of the wireless device upon expiration of the first PDCP reordering timer, a first subset of packets having a sequence number in the sequential order lower than the first packet.

In some examples, the buffer manager 1440 may be configured as or otherwise support a means for removing, from the buffer of the wireless device upon expiration of the first PDCP reordering timer, a second subset of packets having consecutive sequence numbers in the sequential order higher than the first packet and having sequence numbers in the sequential order lower than the second packet.

In some examples, the buffer manager 1440 may be configured as or otherwise support a means for removing, from a buffer of the wireless device upon expiration of the second PDCP reordering timer, a first subset of packets having a sequence number in the sequential order higher than the first packet and lower than the second packet.

In some examples, the buffer manager 1440 may be configured as or otherwise support a means for removing, from the buffer of the wireless device upon expiration of the second PDCP reordering timer, a second subset of packets having consecutive sequence numbers in the sequential order higher than the second packet.

In some examples, the timer initiation component 1435 may be configured as or otherwise support a means for initiating, subsequent to expiration of the second PDCP reordering timer, a third PDCP reordering timer based on a third time stamp corresponding to unsuccessful decoding of a third packet in the sequential order, the third PDCP reordering timer being shorter than the second PDCP reordering timer.

In some examples, the timer modifier 1445 may be configured as or otherwise support a means for modifying the second PDCP reordering timer based on determining that a memory threshold is satisfied. In some examples, the timer modifier 1445 may be configured as or otherwise support a means for initiating the modified second PDCP reordering timer based on a third time stamp different than the second time stamp.

In some examples, the decoding component 1450 may be configured as or otherwise support a means for identifying, upon expiration of the second PDCP reordering timer, that the second packet was unsuccessfully decoded. In some examples, the decoding component 1450 may be configured as or otherwise support a means for initiating a second instance of the first PDCP reordering timer based on a third time stamp corresponding to unsuccessful decoding of a third packet in the sequential order.

In some examples, the decoding component 1450 may be configured as or otherwise support a means for initiating, subsequent to expiration of the first PDCP reordering timer, a third PDCP reordering timer based on a fourth time stamp corresponding to unsuccessful decoding of a fourth packet in the sequential order, the third PDCP reordering timer being shorter than the first PDCP reordering timer.

In some examples, the third PDCP reordering timer is the same as the first PDCP reordering timer or different than the first PDCP reordering timer.

Figure 15:
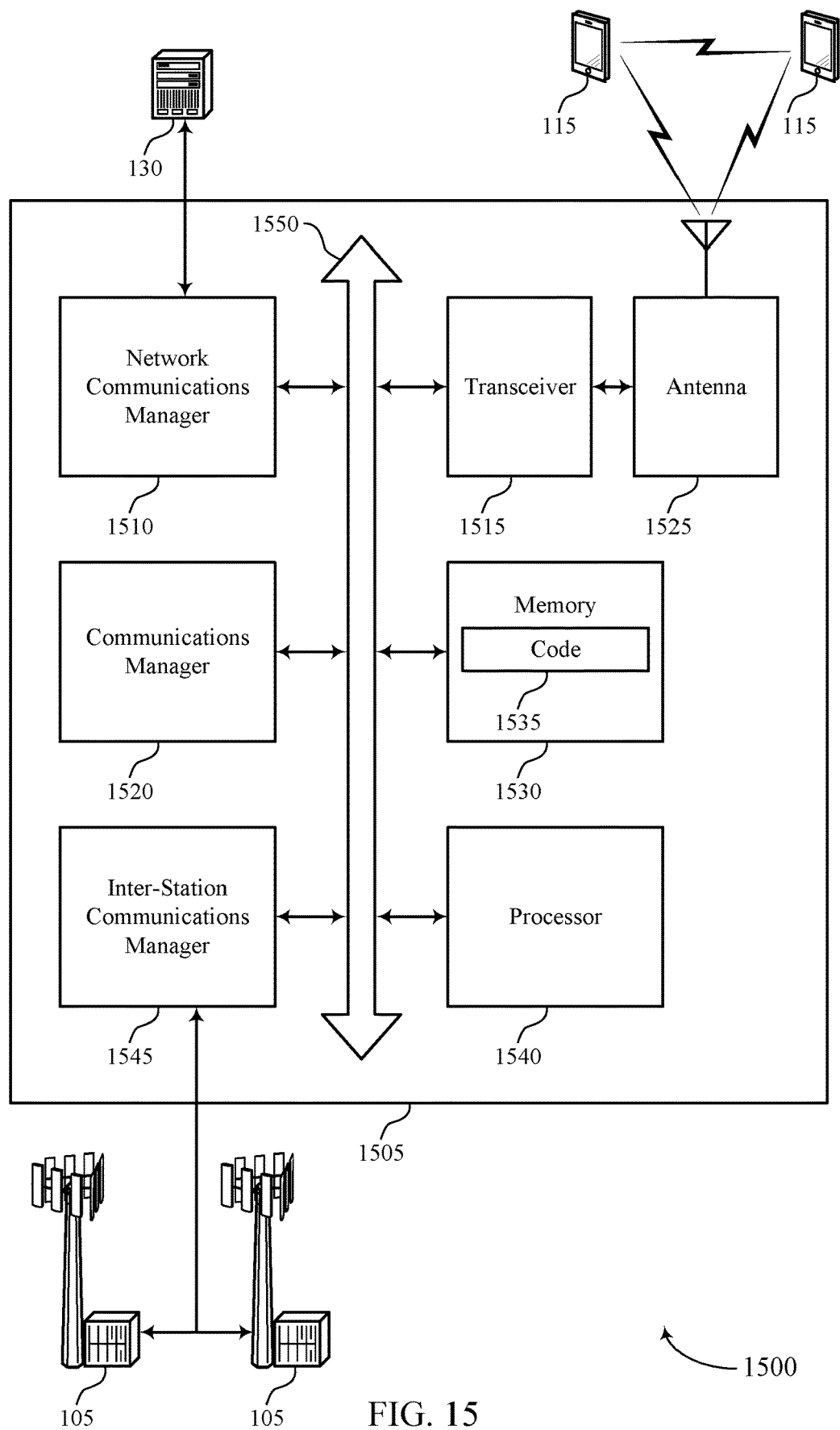
FIG. 15 shows a diagram of a system including a device that supports multiple timers for effective reordering in accordance with aspects of the present disclosure.

FIG. 15 shows a diagram of a system 1500 including a device 1505 that supports multiple timers for effective reordering in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting multiple timers for effective reordering). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a wireless device in accordance with examples as disclosed herein. For example, the communications manager 1520 may be configured as or otherwise support a means for receiving control signaling indicating a time duration of a first PDCP reordering timer. The communications manager 1520 may be configured as or otherwise support a means for receiving a set of multiple packets having a sequential order. The communications manager 1520 may be configured as or otherwise support a means for initiating a first PDCP reordering timer based on a first time stamp corresponding to unsuccessful decoding of a first packet in the sequential order. The communications manager 1520 may be configured as or otherwise support a means for initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer.

By including or configuring the communications manager 1520 in accordance with examples as described herein, the device 1505 may support techniques for reducing memory footprint and increasing overall signal reliability by utilizing multiple PDCP reordering timers to more efficiently perform reordering operations. Further, appending and removing timers for multiple identified packet sequence numbers, or adjusting the duration of one or more timers, or both, may result in a more efficient use of memory, improved data throughput, decreased delays, and improved user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of multiple timers for effective reordering as described herein, or the processor 1540 and the memory 1530 may be otherwise configured to perform or support such operations.

Figure 16:
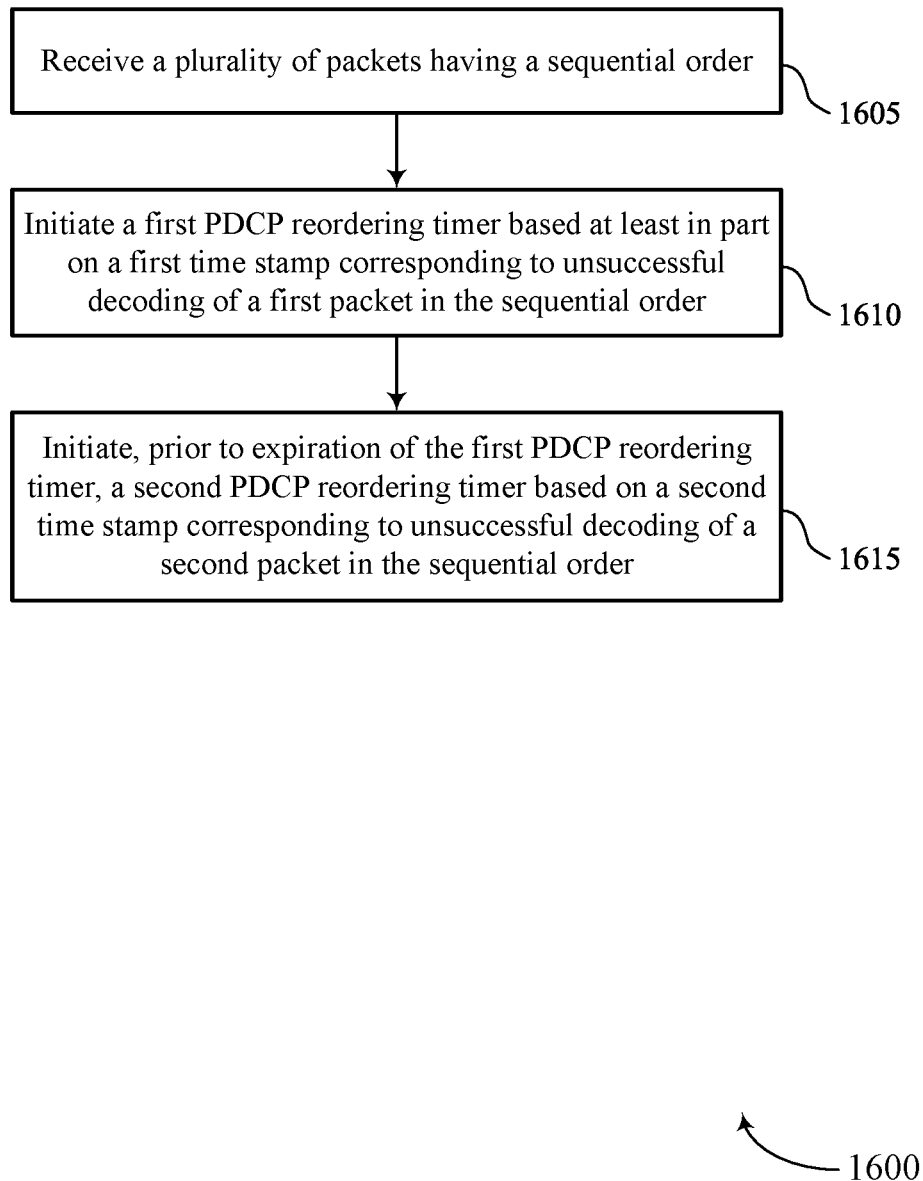
FIGS. 16 through 19 show flowcharts illustrating methods that support multiple timers for effective reordering in accordance with aspects of the present disclosure.

FIG. 16 shows a flowchart illustrating a method 1600 that supports multiple timers for effective reordering in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a set of multiple packets having a sequential order. The operations of 1605 may be performed in accordance with examples as disclosed herein. In some examples, aspects of the operations of 1605 may be performed by a packet receiving component 1025 as described with reference to FIG. 10.

At 1610, the method may include initiating a first PDCP reordering timer based on a first time stamp corresponding to unsuccessful decoding of a first packet in the sequential order. The operations of 1610 may be performed in accordance with examples as disclosed herein. In some examples, aspects of the operations of 1610 may be performed by a PDCP reordering timer component 1030 as described with reference to FIG. 10.

At 1615, the method may include initiating, prior to expiration of the first PDCP reordering timer, a second PDCP reordering timer based on a second time stamp corresponding to unsuccessful decoding of a second packet in the sequential order. The operations of 1615 may be performed in accordance with examples as disclosed herein. In some examples, aspects of the operations of 1615 may be performed by a reordering PDCP timer component 1030 as described with reference to FIG. 10.

Figure 17:
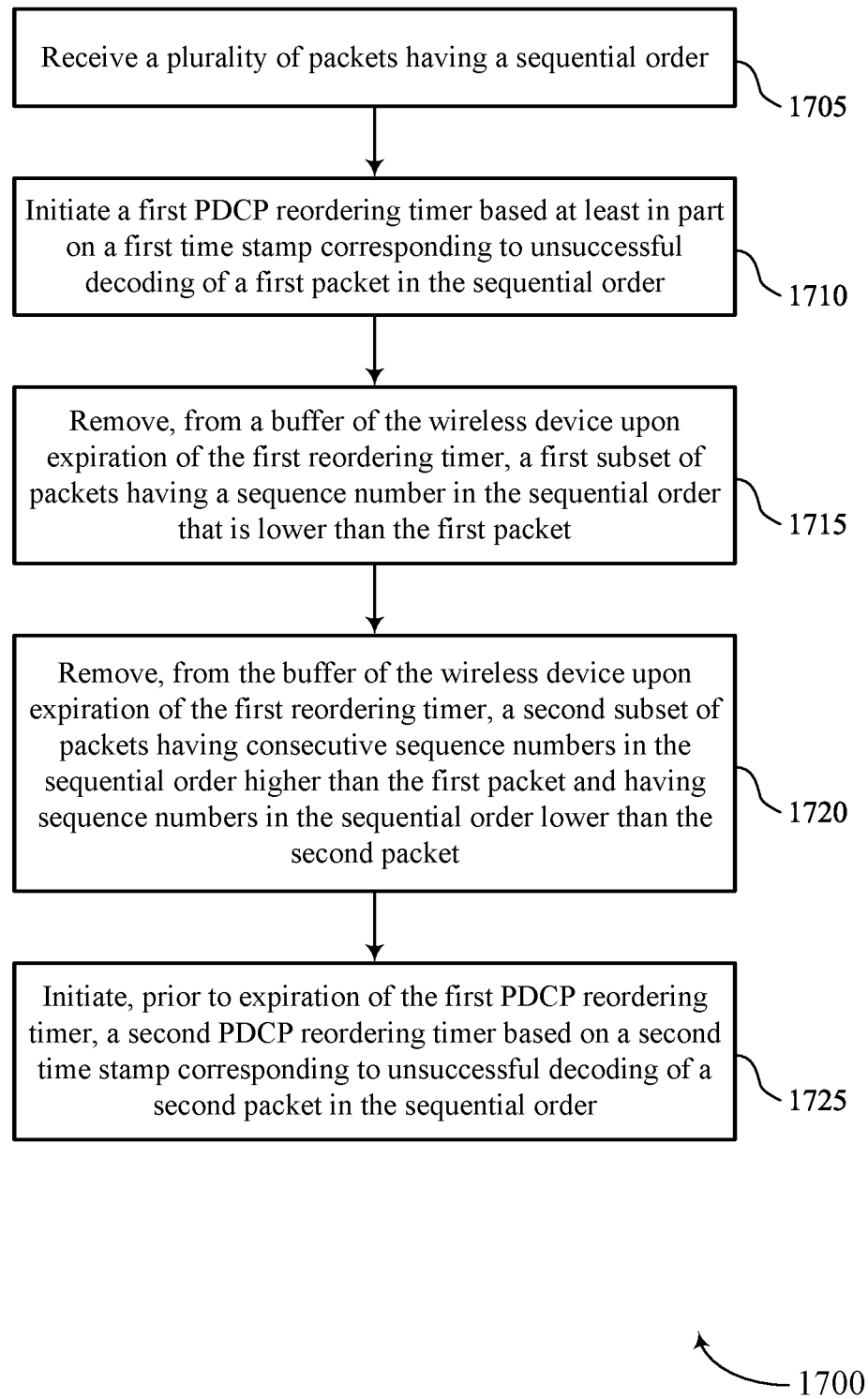

FIG. 17 shows a flowchart illustrating a method 1700 that supports multiple timers for effective reordering in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a set of multiple packets having a sequential order. The operations of 1705 may be performed in accordance with examples as disclosed herein. In some examples, aspects of the operations of 1705 may be performed by a packet receiving component 1025 as described with reference to FIG. 10.

At 1710, the method may include initiating a first PDCP reordering timer based on a first time stamp corresponding to unsuccessful decoding of a first packet in the sequential order. The operations of 1710 may be performed in accordance with examples as disclosed herein. In some examples, aspects of the operations of 1710 may be performed by a PDCP reordering timer component 1030 as described with reference to FIG. 10.

At 1715, the method may include removing, from a buffer of the wireless device upon expiration of the first PDCP reordering timer, a first subset of packets having a sequence number in the sequential order that is lower than the first packet. The operations of 1715 may be performed in accordance with examples as disclosed herein. In some examples, aspects of the operations of 1715 may be performed by a buffering component 1040 as described with reference to FIG. 10.

At 1720, the method may include removing, from the buffer of the wireless device upon expiration of the first PDCP reordering timer, a second subset of packets having consecutive sequence numbers in the sequential order higher than the first packet and having sequence numbers in the sequential order lower than the second packet. The operations of 1720 may be performed in accordance with examples as disclosed herein. In some examples, aspects of the operations of 1720 may be performed by a buffering component 1040 as described with reference to FIG. 10.

At 1725, the method may include initiating, prior to expiration of the first PDCP reordering timer, a second PDCP reordering timer based on a second time stamp corresponding to unsuccessful decoding of a second packet in the sequential order. The operations of 1725 may be performed in accordance with examples as disclosed herein. In some examples, aspects of the operations of 1725 may be performed by a PDCP reordering timer component 1030 as described with reference to FIG. 10.

Figure 18:
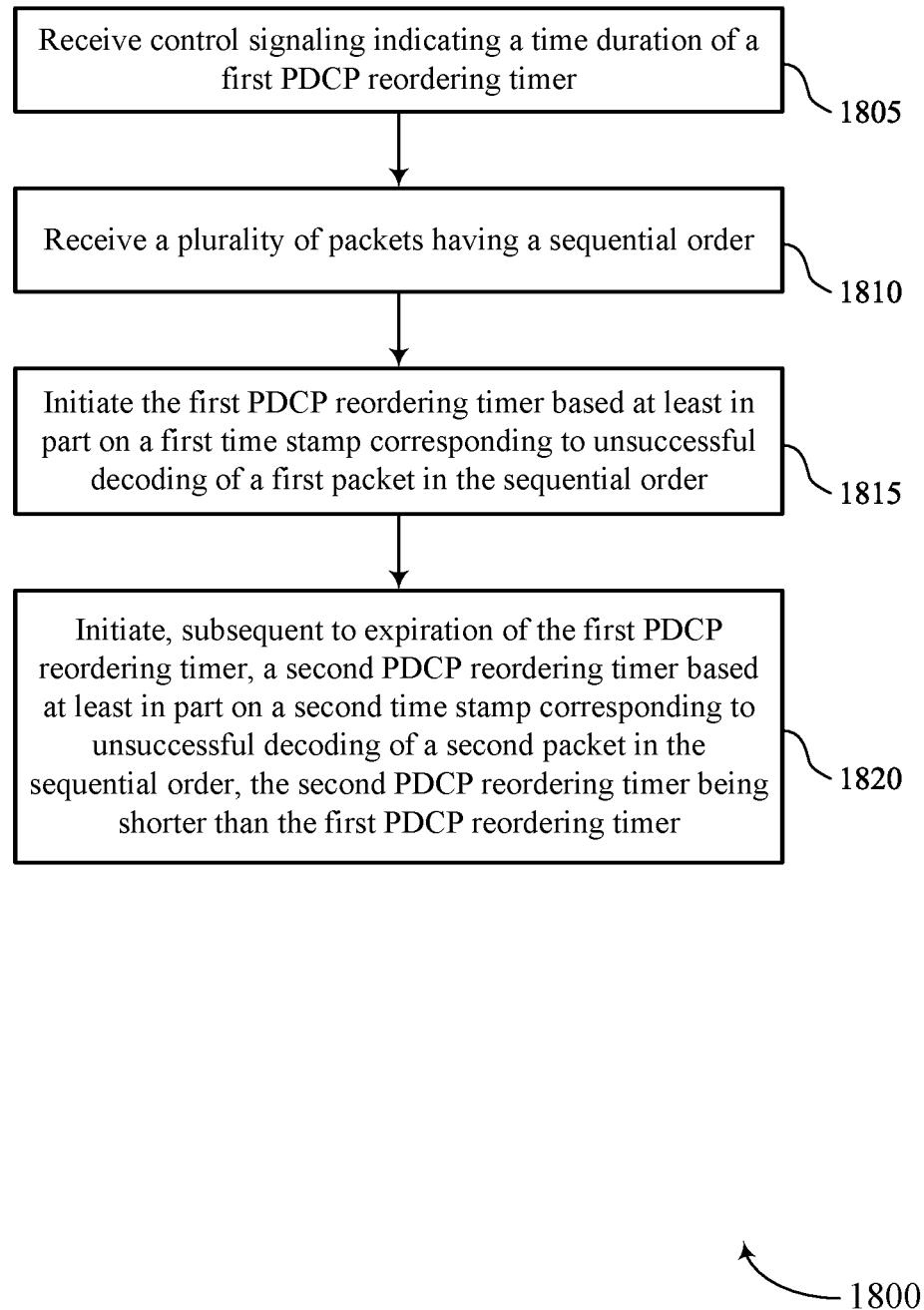

FIG. 18 shows a flowchart illustrating a method 1800 that supports multiple timers for effective reordering in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include receiving control signaling indicating a time duration of a first PDCP reordering timer. The operations of 1805 may be performed in accordance with examples as disclosed herein. In some examples, aspects of the operations of 1805 may be performed by a control signaling component 1425 as described with reference to FIG. 14.

At 1810, the method may include receiving a set of multiple packets having a sequential order. The operations of 1810 may be performed in accordance with examples as disclosed herein. In some examples, aspects of the operations of 1810 may be performed by a packet receiver component 1430 as described with reference to FIG. 14.

At 1815, the method may include initiating a first PDCP reordering timer based on a first time stamp corresponding to unsuccessful decoding of a first packet in the sequential order. The operations of 1815 may be performed in accordance with examples as disclosed herein. In some examples, aspects of the operations of 1815 may be performed by a timer initiation component 1435 as described with reference to FIG. 14.

At 1820, the method may include initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer. The operations of 1820 may be performed in accordance with examples as disclosed herein. In some examples, aspects of the operations of 1820 may be performed by a timer initiation component 1435 as described with reference to FIG. 14.

Figure 19:
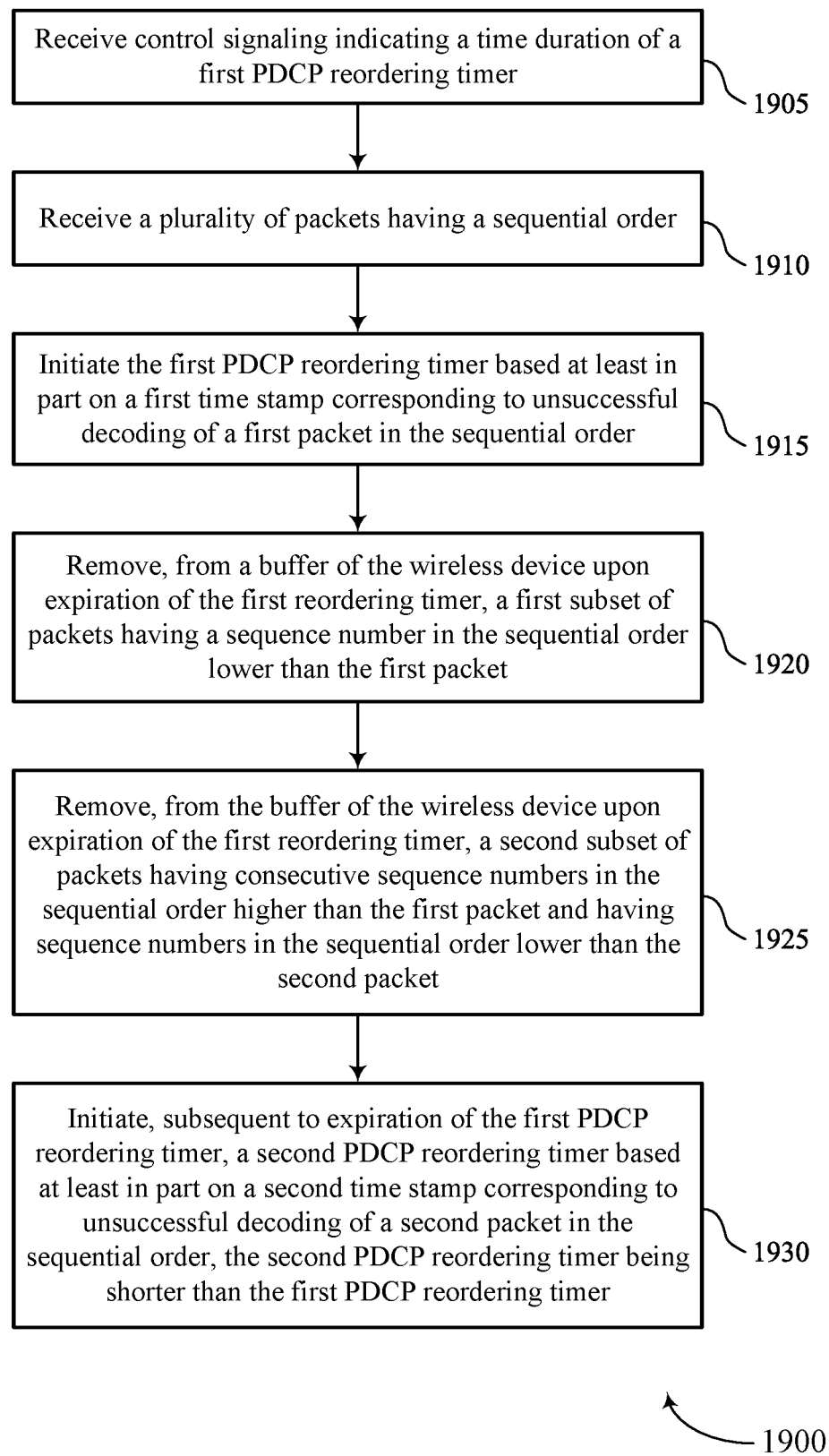

FIG. 19 shows a flowchart illustrating a method 1900 that supports multiple timers for effective reordering in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include receiving control signaling indicating a time duration of a first PDCP reordering timer. The operations of 1905 may be performed in accordance with examples as disclosed herein. In some examples, aspects of the operations of 1905 may be performed by a control signaling component 1425 as described with reference to FIG. 14.

At 1910, the method may include receiving a set of multiple packets having a sequential order. The operations of 1910 may be performed in accordance with examples as disclosed herein. In some examples, aspects of the operations of 1910 may be performed by a packet receiver component 1430 as described with reference to FIG. 14.

At 1915, the method may include initiating a first PDCP reordering timer based on a first time stamp corresponding to unsuccessful decoding of a first packet in the sequential order. The operations of 1915 may be performed in accordance with examples as disclosed herein. In some examples, aspects of the operations of 1915 may be performed by a timer initiation component 1435 as described with reference to FIG. 14.

At 1920, the method may include removing, from a buffer of the wireless device upon expiration of the first PDCP reordering timer, a first subset of packets having a sequence number in the sequential order lower than the first packet. The operations of 1920 may be performed in accordance with examples as disclosed herein. In some examples, aspects of the operations of 1920 may be performed by a buffer manager 1440 as described with reference to FIG. 14.

At 1925, the method may include removing, from the buffer of the wireless device upon expiration of the first PDCP reordering timer, a second subset of packets having consecutive sequence numbers in the sequential order higher than the first packet and having sequence numbers in the sequential order lower than the second packet. The operations of 1925 may be performed in accordance with examples as disclosed herein. In some examples, aspects of the operations of 1925 may be performed by a buffer manager 1440 as described with reference to FIG. 14.

At 1930, the method may include initiating, subsequent to expiration of the first PDCP reordering timer, a second PDCP reordering timer based on a second time stamp corresponding to unsuccessful decoding of a second packet in the sequential order, the second PDCP reordering timer being shorter than the first PDCP reordering timer. The operations of 1930 may be performed in accordance with examples as disclosed herein. In some examples, aspects of the operations of 1930 may be performed by a timer initiation component 1435 as described with reference to FIG. 14.

The following provides an overview of aspects of the present disclosure:

Aspect 1: A method for wireless communications at a wireless device, comprising: receiving a plurality of packets having a sequential order; initiating a first PDCP reordering timer based at least in part on a first time stamp corresponding to unsuccessful decoding of a first packet in the sequential order; and initiating, prior to expiration of the first PDCP reordering timer, a second PDCP reordering timer based on a second time stamp corresponding to unsuccessful decoding of a second packet in the sequential order.

Aspect 2: The method of aspect 1, further comprising: receiving control signaling indicating a duration of the first PDCP reordering timer.

Aspect 3: The method of any of aspects 1 through 2, wherein receiving the plurality of packets comprises: receiving a first subset of the plurality of packets via a first wireless communications link; and receiving a second subset of the plurality of packets via the first wireless communications link or a second wireless communications link.

Aspect 4: The method of aspect 3, further comprising: storing one or more packets of the first subset of the plurality of packets in a first queue; and storing one or more packets of the second subset of the plurality of packets in a second queue.

Aspect 5: The method of aspect 4, wherein the one or more packets of the first subset of the plurality of packets, the one or more packets of the second subset of the plurality of packets, or both, have sequence numbers higher than the first packet.

Aspect 6: The method of any of aspects 3 through 5, wherein the first wireless communications link is a first radio bearer of a split radio bearer that operates in accordance with a first radio access technology, and the second wireless communications link is a second radio bearer of the split radio bearer that operates in accordance with the first wireless communications link or a second radio access technology.

Aspect 7: The method of any of aspects 1 through 6, further comprising: removing, from a buffer of the wireless device upon expiration of the first PDCP reordering timer, a first subset of packets having a sequence number in the sequential order that is lower than the first packet.

Aspect 8: The method of aspect 7, further comprising: removing, from the buffer of the wireless device upon expiration of the first PDCP reordering timer, a second subset of packets having consecutive sequence numbers in the sequential order higher than the first packet and having sequence numbers in the sequential order lower than the second packet.

Aspect 9: The method of any of aspects 1 through 8, further comprising: removing, from a buffer of the wireless device upon expiration of the second PDCP reordering timer, a first subset of packets having a sequence number in the sequential order higher than the first packet and lower than the second packet.

Aspect 10: The method of aspect 9, further comprising: removing, from the buffer of the wireless device upon expiration of the second PDCP reordering timer, a second subset of packets having consecutive sequence numbers higher than the second packet.

Aspect 11: The method of any of aspects 1 through 10, further comprising: initiating, prior to expiration of the first PDCP reordering timer, the second PDCP reordering timer, or both, a third PDCP reordering timer based on a third time stamp corresponding to unsuccessful decoding of a third packet.

Aspect 12: The method of any of aspects 1 through 11, further comprising: receiving the first packet during a duration of the first PDCP reordering timer; and removing the first PDCP reordering timer from a queue of PDCP reordering timers comprising the first PDCP reordering timer and the second PDCP reordering timer.

Aspect 13: A method for wireless communications at a wireless device, comprising: receiving control signaling indicating a time duration of a first PDCP reordering timer; receiving a plurality of packets having a sequential order; initiating a first PDCP reordering timer based at least in part on a first time stamp corresponding to unsuccessful decoding of a first packet in the sequential order; and initiating, subsequent to expiration of the first PDCP reordering timer, a second PDCP reordering timer based at least in part on a second time stamp corresponding to unsuccessful decoding of a second packet in the sequential order, the second PDCP reordering timer being shorter than the first PDCP reordering timer.

Aspect 14: The method of aspect 13, wherein receiving the plurality of packets comprises: receiving a first subset of the plurality of packets via a first wireless communications link; and receiving a second subset of the plurality of packets via the first wireless communications link or a second wireless communications link.

Aspect 15: The method of aspect 14, further comprising: storing one or more packets of the first subset of the plurality of packets in a first queue; and storing one or more packets of the second subset of the plurality of packets in a second queue.

Aspect 16: The method of any of aspects 14 through 15, wherein the one or more packets of the first subset of the plurality of packets, the one or more packets of the second subset of the plurality of packets, or both, have sequence numbers higher than the first packet.

Aspect 17: The method of any of aspects 14 through 16, wherein the first wireless communications link is a first radio bearer of a split radio bearer that operates in accordance with a first radio access technology, and the second wireless communications link is a second radio bearer of the split radio bearer that operates in accordance with the first radio access technology or a second radio access technology.

Aspect 18: The method of any of aspects 13 through 17, further comprising: removing, from a buffer of the wireless device upon expiration of the first PDCP reordering timer, a first subset of packets having a sequence number in the sequential order lower than the first packet.

Aspect 19: The method of aspect 18, further comprising: removing, from the buffer of the wireless device upon expiration of the first PDCP reordering timer, a second subset of packets having consecutive sequence numbers in the sequential order higher than the first packet and having sequence numbers in the sequential order lower than the second packet.

Aspect 20: The method of any of aspects 13 through 19, further comprising: removing, from a buffer of the wireless device upon expiration of the second PDCP reordering timer, a first subset of packets having a sequence number in the sequential order higher than the first packet and lower than the second packet.

Aspect 21: The method of aspect 20, further comprising: removing, from the buffer of the wireless device upon expiration of the second PDCP reordering timer, a second subset of packets having consecutive sequence numbers in the sequential order higher than the second packet.

Aspect 22: The method of any of aspects 13 through 21, further comprising: initiating, subsequent to expiration of the second PDCP reordering timer, a third PDCP reordering timer based on a third time stamp corresponding to unsuccessful decoding of a third packet in the sequential order, the third PDCP reordering timer being shorter than the second PDCP reordering timer.

Aspect 23: The method of any of aspects 13 through 22, further comprising: modifying the second PDCP reordering timer based at least in part on determining that a memory threshold is satisfied; and initiating the modified second PDCP reordering timer based at least in part on a third time stamp different than the second time stamp.

Aspect 24: The method of any of aspects 13 through 23, further comprising: identifying, upon expiration of the second PDCP reordering timer, that the second packet was unsuccessfully decoded; and initiating a second instance of the first PDCP reordering timer based at least in part on a third time stamp corresponding to unsuccessful decoding of a third packet in the sequential order.

Aspect 25: The method of aspect 24, further comprising: initiating, subsequent to expiration of the first PDCP reordering timer, a third PDCP reordering timer based at least in part on a fourth time stamp corresponding to unsuccessful decoding of a fourth packet in the sequential order, the third PDCP reordering timer being shorter than the first PDCP reordering timer.

Aspect 26: The method of aspect 25, wherein the third PDCP reordering timer is the same as the first PDCP reordering timer or different than the first PDCP reordering timer.

Aspect 27: An apparatus for wireless communications at a wireless device, comprising a processor; memory coupled with the processor; and instructions stored in the memory and executable by the processor to cause the apparatus to perform a method of any of aspects 1 through 12.

Aspect 28: An apparatus for wireless communications at a wireless device, comprising at least one means for performing a method of any of aspects 1 through 12.

Aspect 29: A non-transitory computer-readable medium storing code for wireless communications at a wireless device, the code comprising instructions executable by a processor to perform a method of any of aspects 1 through 12.

Aspect 30: An apparatus for wireless communications at a wireless device, comprising a processor; memory coupled with the processor; and instructions stored in the memory and executable by the processor to cause the apparatus to perform a method of any of aspects 13 through 26.

Aspect 31: An apparatus for wireless communications at a wireless device, comprising at least one means for performing a method of any of aspects 13 through 26.

Aspect 32: A non-transitory computer-readable medium storing code for wireless communications at a wireless device, the code comprising instructions executable by a processor to perform a method of any of aspects 13 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein

What is claimed is:

1. An apparatus for wireless communications at a wireless device, comprising:
   a processor;
   memory coupled with the processor; and
   instructions stored in the memory and executable by the processor to cause the apparatus to:
      receive a first subset of a plurality of packets having a sequential order via a first radio bearer of a split radio bearer that operates in accordance with a first radio access technology and a second subset of the plurality of packets via a second radio bearer of the split radio bearer that operates in accordance with the first radio access technology or a second radio access technology;
      initiate a first packet data convergence protocol (PDCP) reordering timer based at least in part on a first time stamp corresponding to unsuccessful decoding of a first packet in the sequential order; and
      initiate, prior to expiration of the first PDCP reordering timer, a second PDCP reordering timer based on a second time stamp corresponding to unsuccessful decoding of a second packet in the sequential order.

2. The apparatus of claim 1, wherein the instructions are further executable by the processor to cause the apparatus to:
   receive control signaling indicating a duration of the first PDCP reordering timer.

3. The apparatus of claim 1, wherein the instructions to receive the plurality of packets are executable by the processor to cause the apparatus to:
   receive the first subset of the plurality of packets via a first wireless communications link comprising the first radio bearer of the split radio bearer; and
   receive the second subset of the plurality of packets via the first wireless communications link or a second wireless communications link comprising the second radio bearer of the split radio bearer.

4. The apparatus of claim 3, wherein the instructions are further executable by the processor to cause the apparatus to:
   store one or more packets of the first subset of the plurality of packets in a first queue; and
   store one or more packets of the second subset of the plurality of packets in a second queue.

5. The apparatus of claim 4, wherein the one or more packets of the first subset of the plurality of packets, the one or more packets of the second subset of the plurality of packets, or both, have sequence numbers higher than the first packet.

6. The apparatus of claim 1, wherein the instructions are further executable by the processor to cause the apparatus to:
   remove, from a buffer of the wireless device upon expiration of the first PDCP reordering timer, a first subset of packets having a sequence number in the sequential order that is lower than the first packet.

7. The apparatus of claim 6, wherein the instructions are further executable by the processor to cause the apparatus to:

remove, from the buffer of the wireless device upon expiration of the first PDCP reordering timer, a second subset of packets having consecutive sequence numbers in the sequential order higher than the first packet and having sequence numbers in the sequential order lower than the second packet.

8. The apparatus of claim 1, wherein the instructions are further executable by the processor to cause the apparatus to:
remove, from a buffer of the wireless device upon expiration of the second PDCP reordering timer, a first subset of packets having a sequence number in the sequential order higher than the first packet and lower than the second packet.

9. The apparatus of claim 8, wherein the instructions are further executable by the processor to cause the apparatus to:
remove, from the buffer of the wireless device upon expiration of the second PDCP reordering timer, a second subset of packets having consecutive sequence numbers higher than the second packet.

10. The apparatus of claim 1, wherein the instructions are further executable by the processor to cause the apparatus to:
initiate, prior to expiration of the first PDCP reordering timer, the second PDCP reordering timer, or both, a third PDCP reordering timer based on a third time stamp corresponding to unsuccessful decoding of a third packet.

11. The apparatus of claim 1, wherein the instructions are further executable by the processor to cause the apparatus to:
receive the first packet during a duration of the first PDCP reordering timer; and
remove the first PDCP reordering timer from a queue of PDCP reordering timers comprising the first PDCP reordering timer and the second PDCP reordering timer.

12. An apparatus for wireless communications at a wireless device, comprising:
a processor;
memory coupled with the processor; and
instructions stored in the memory and executable by the processor to cause the apparatus to:
receive control signaling indicating a time duration of a first packet data convergence protocol (PDCP) reordering timer;
receive a plurality of packets having a sequential order;
initiate the first PDCP reordering timer based at least in part on a first time stamp corresponding to unsuccessful decoding of a first packet in the sequential order; and
initiate, subsequent to expiration of the first PDCP reordering timer, a second PDCP reordering timer based at least in part on a second time stamp corresponding to unsuccessful decoding of a second packet in the sequential order, the second PDCP reordering timer being shorter than the first PDCP reordering timer.

13. The apparatus of claim 12, wherein the instructions to receive the plurality of packets are executable by the processor to cause the apparatus to:
receive a first subset of the plurality of packets via a first wireless communications link; and
receive a second subset of the plurality of packets via the first wireless communications link or a second wireless communications link.

14. The apparatus of claim 13, wherein the instructions are further executable by the processor to cause the apparatus to:
store one or more packets of the first subset of the plurality of packets in a first queue; and
store one or more packets of the second subset of the plurality of packets in a second queue.

15. The apparatus of claim 14, wherein the one or more packets of the first subset of the plurality of packets, the one or more packets of the second subset of the plurality of packets, or both, have sequence numbers higher than the first packet.

16. The apparatus of claim 13, wherein the first wireless communications link is a first radio bearer of a split radio bearer that operates in accordance with a first radio access technology, and the second wireless communications link is a second radio bearer of the split radio bearer that operates in accordance with the first radio access technology or a second radio access technology.

17. The apparatus of claim 12, wherein the instructions are further executable by the processor to cause the apparatus to:
remove, from a buffer of the wireless device upon expiration of the first PDCP reordering timer, a first subset of packets having a sequence number in the sequential order lower than the first packet.

18. The apparatus of claim 17, wherein the instructions are further executable by the processor to cause the apparatus to:
remove, from the buffer of the wireless device upon expiration of the first PDCP reordering timer, a second subset of packets having consecutive sequence numbers in the sequential order higher than the first packet and having sequence numbers in the sequential order lower than the second packet.

19. The apparatus of claim 12, wherein the instructions are further executable by the processor to cause the apparatus to:
remove, from a buffer of the wireless device upon expiration of the second PDCP reordering timer, a first subset of packets having a sequence number in the sequential order higher than the first packet and lower than the second packet.

20. The apparatus of claim 19, wherein the instructions are further executable by the processor to cause the apparatus to:
remove, from the buffer of the wireless device upon expiration of the second PDCP reordering timer, a second subset of packets having consecutive sequence numbers in the sequential order higher than the second packet.

21. The apparatus of claim 12, wherein the instructions are further executable by the processor to cause the apparatus to:
initiate, subsequent to expiration of the second PDCP reordering timer, a third PDCP reordering timer based on a third time stamp corresponding to unsuccessful decoding of a third packet in the sequential order, the third PDCP reordering timer being shorter than the second PDCP reordering timer.

22. The apparatus of claim 12, wherein the instructions are further executable by the processor to cause the apparatus to:
modify the second PDCP reordering timer based at least in part on determining that a memory threshold is satisfied; and
initiate the modified second PDCP reordering timer based at least in part on a third time stamp different than the second time stamp.

23. The apparatus of claim 12, wherein the instructions are further executable by the processor to cause the apparatus to:
- identify, upon expiration of the second PDCP reordering timer, that the second packet was unsuccessfully decoded; and
- initiate a second instance of the first PDCP reordering timer based at least in part on a third time stamp corresponding to unsuccessful decoding of a third packet in the sequential order.

24. The apparatus of claim 23, wherein the instructions are further executable by the processor to cause the apparatus to:
- initiate, subsequent to expiration of the first PDCP reordering timer, a third PDCP reordering timer based at least in part on a fourth time stamp corresponding to unsuccessful decoding of a fourth packet in the sequential order, the third PDCP reordering timer being shorter than the first PDCP reordering timer.

25. The apparatus of claim 24, wherein the third PDCP reordering timer is the same as the first PDCP reordering timer or different than the first PDCP reordering timer.

26. A method for wireless communications at a wireless device, comprising:
- receiving a first subset of a plurality of packets having a sequential order via a first radio bearer of a split radio bearer that operates in accordance with a first radio access technology and a second subset of the plurality of packets via a second radio bearer of the split radio bearer that operates in accordance with the first radio access technology or a second radio access technology;
- initiating a first packet data convergence protocol (PDCP) reordering timer based at least in part on a first time stamp corresponding to unsuccessful decoding of a first packet in the sequential order; and
- initiating, prior to expiration of the first PDCP reordering timer, a second PDCP reordering timer based on a second time stamp corresponding to unsuccessful decoding of a second packet in the sequential order.

27. The method of claim 26, further comprising:
receiving control signaling indicating a duration of the first PDCP reordering timer.

28. A method for wireless communications at a wireless device, comprising:
- receiving control signaling indicating a time duration of a first packet data convergence protocol (PDCP) reordering timer;
- receiving a plurality of packets having a sequential order;
- initiating the first PDCP reordering timer based at least in part on a first time stamp corresponding to unsuccessful decoding of a first packet in the sequential order; and
- initiating, subsequent to expiration of the first PDCP reordering timer, a second PDCP reordering timer based at least in part on a second time stamp corresponding to unsuccessful decoding of a second packet in the sequential order, the second PDCP reordering timer being shorter than the first PDCP reordering timer.

29. The method of claim 28, wherein receiving the plurality of packets comprises:
- receiving a first subset of the plurality of packets via a first wireless communications link; and
- receiving a second subset of the plurality of packets via the first wireless communications link or a second wireless communications link.

* * * * *